(12) United States Patent
Zhang et al.

(10) Patent No.: US 12,405,713 B2
(45) Date of Patent: Sep. 2, 2025

(54) METHOD FOR INTELLIGENT GRAPHIC ASSOCIATION AND INTELLIGENT INTERACTIVE DISPLAY DEVICE

(71) Applicant: BOE Technology Group Co., Ltd., Beijing (CN)

(72) Inventors: Jizhe Zhang, Beijing (CN); Lifei Zhao, Beijing (CN); Pengyu Liu, Beijing (CN); Chao Zhang, Beijing (CN); Zilong Du, Beijing (CN); Xin Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/267,425

(22) PCT Filed: Mar. 28, 2022

(86) PCT No.: PCT/CN2022/083360
§ 371 (c)(1),
(2) Date: Jun. 14, 2023

(87) PCT Pub. No.: WO2023/184083
PCT Pub. Date: Oct. 5, 2023

(65) Prior Publication Data
US 2025/0068313 A1 Feb. 27, 2025

(51) Int. Cl.
*G06F 3/04845* (2022.01)
*G06F 3/04817* (2022.01)
(Continued)

(52) U.S. Cl.
CPC ...... *G06F 3/04845* (2013.01); *G06F 3/04817* (2013.01); *G06F 3/04883* (2013.01); *H04N 7/15* (2013.01)

(58) Field of Classification Search
CPC ............. G06F 3/04845; G06F 3/04817; G06F 3/04883; H04N 7/15
See application file for complete search history.

(56) References Cited

U.S. PATENT DOCUMENTS

2012/0229450 A1* 9/2012 Kim ................... G06F 3/04883
345/419
2014/0071057 A1 3/2014 Xia et al.
(Continued)

FOREIGN PATENT DOCUMENTS

CN 112181207 A 1/2021
CN 114138165 A 3/2022

OTHER PUBLICATIONS

PCT/CN2022/083360 international search report.

*Primary Examiner* — Premal R Patel
(74) *Attorney, Agent, or Firm* — IPro, PLLC

(57) ABSTRACT

A method for intelligent graphic association and an intelligent interactive display device are disclosed. The device includes a display screen and a control circuit, the display screen is configured to display content; the control circuit includes a processor and a memory, the memory is configured to store a program executable by the processor, and the processor is configured to read the program in the memory and perform following steps: obtaining first trajectory information of a hand-drawn graphic of a user; performing graphic recognition on the first trajectory information, and determining a standard graphic corresponding to the hand-drawn graphic according to a recognition result, where the standard graphic conforms to a predefined graphic specification; and displaying a control list of the standard graphic, where the control list includes at least one associative icon related to the standard graphic.

20 Claims, 12 Drawing Sheets

(51) Int. Cl.
G06F 3/04883 (2022.01)
H04N 7/15 (2006.01)

(56) References Cited

U.S. PATENT DOCUMENTS

2015/0067568 A1* 3/2015 Lee .................. G06F 3/0488
715/771
2016/0350951 A1* 12/2016 Chan ................ G06T 11/206

* cited by examiner

Hand-drawn rectangle        Standard rectangle

Hand-drawn pentagon        Standard pentagon

Hand-drawn coordinate axis        Standard coordinate axis

Hand-drawn circle 1      Hand-drawn circle 2

Hand-drawn circle 3      Hand-drawn circle 4

Hand-drawn triangle 1  Hand-drawn triangle 2

Hand-drawn triangle 3

Hand-drawn rectangle 1  Hand-drawn rectangle 2

Hand-drawn trapezoid 1          Hand-drawn trapezoid 2

METHOD FOR INTELLIGENT GRAPHIC ASSOCIATION AND INTELLIGENT INTERACTIVE DISPLAY DEVICE

This application is a National Stage of International Application No. PCT/CN2022/083360, filed on Mar. 28, 2022, which is hereby incorporated by reference in its entirety.

FIELD

The disclosure relates to the field of intelligent software technology, and particularly to a method for intelligent graphic association and an intelligent interactive display device.

BACKGROUND

The conference is one of the most common forms of work. But, with the continuous development of the times and the continuous advancement of science and technology, the traditional conference mode is no longer suitable for requirements of modern office, and the importance of conference efficiency and interactive experience in the enterprise conference emerges gradually. Thus, the smart conference is proposed. The smart conference is an office product that integrates various devices such as an electronic whiteboard, a computer and a remote conference terminal, and has multiple functions such as interactive smart whiteboard.

With the advancement of high-precision positioning technologies such as infrared, electromagnetic and capacitive touch, the electronic whiteboard can already realize touch writing. When the electronic whiteboard is used for conferences, there is often a need for graphical presentation. However, the current electronic whiteboard products need to hand-draw various graphics when making such graphs, such as histograms, pie charts, etc. Due to the low efficiency of hand-drawing, it is difficult to guarantee the accuracy of graphic drawing, thus causing the great trouble to conferees and subsequent processing of graphic array.

SUMMARY

The disclosure provides a method for intelligent graphic association and an intelligent interactive display device, to provide a user with a selection scheme of a standard graphic corresponding to a hand-drawn graphic according to the hand-drawn graphic of the user, improving user experience.

In a first aspect, an embodiment of the disclosure provides an intelligent interactive display device, including a display screen and a control circuit, where: the display screen is configured to display content: the control circuit includes a processor and a memory, the memory is configured to store a program executable by the processor, and the processor is configured to read the program in the memory and perform following steps: obtaining first trajectory information of a hand-drawn graphic of a user: performing graphic recognition on the first trajectory information, and determining a standard graphic corresponding to the hand-drawn graphic according to a recognition result, where the standard graphic conforms to a predefined graphic specification: generating and displaying a graph associated with the standard graphic.

As an optional embodiment, the processor is configured to: display a control list of the standard graphic, where the control list includes at least one associative icon related to the standard graphic: generate and display the graph associated with the standard graphic in response to the user's instruction to select the associative icon.

As an optional embodiment, the processor is configured to: in response to the user's instruction to select the associative icon, insert a graph corresponding to the associative icon into a display interface of the hand-drawn graphic of the user; and/or in response to the user's instruction to select the associative icon, jump to a graph drawing interface corresponding to the associative icon, and display a corresponding graph on the graph drawing interface.

As an optional embodiment, the control list includes a plurality of associative icons related to the standard graphic, and the processor is configured to: in response to the user's instruction to select one associative icon of the associative icons included in the control list, insert a graph corresponding to the associative icon into a display interface of the hand-drawn graphic of the user: in response to the user's instruction to select another associative icon included in the control list, jump to a graph drawing interface corresponding to the associative icon, and display a corresponding graph on the graph drawing interface.

As an optional embodiment, the associative icon includes at least one of a pie chart icon, a bar chart icon, or a radar chart icon.

As an optional embodiment, the graph associated with the standard graphic includes a three-dimensional graphic, and the processor is configured to: in response to the user's rotation instruction for the three-dimensional graphic, rotate and display the three-dimensional graphic in a direction corresponding to the rotation instruction.

As an optional embodiment, the processor is configured to: generate and display the graph associated with the standard graphic in response to an instruction to add a coordinate axis drawn by the user.

As an optional embodiment, the processor is configured to: jump to a graph drawing interface of the graph associated with the standard graphic, and display the graph on the graph drawing interface, in response to the instruction to add the coordinate axis drawn by the user.

As an optional embodiment, the processor is configured to: when the standard graphic is a circle, jump to a graph drawing interface corresponding to a pie chart, and display the pie chart on the graph drawing interface, in response to the instruction to add the coordinate axis drawn by the user: or when the standard graphic is a rectangle, jump to a graph drawing interface corresponding to a bar chart, and display the bar chart on the graph drawing interface, in response to the instruction to add the coordinate axis drawn by the user: or when the standard graphic is a pentagon, jump to a graph drawing interface corresponding to a radar chart, and display the radar chart on the graph drawing interface, in response to the instruction to add the coordinate axis drawn by the user.

As an optional embodiment, after generating and displaying the graph associated with the standard graphic, the processor is further configured to: edit the graph correspondingly in response to the user's editing instruction for the graph, where the editing instruction includes at least one instruction of dividing the graph or merging a plurality of sub-areas included in the graph.

As an optional embodiment, the editing instruction includes an instruction to divide the graph, and the processor is configured to: determine a standard dividing line corresponding to second trajectory information for dividing the graph included in the editing instruction according to the second trajectory information: display the second trajectory information as the standard dividing line, to divide the graph by the standard dividing line to obtain a plurality of divided areas.

As an optional embodiment, the processor is configured to: when the graph is a pie chart, the divided area represents a proportion of a same type of data in data included in the graph: or when the graph is a rectangle, the divided area represents a cell of a table.

As an optional embodiment, the graph is a pie chart, and when the second trajectory information passes through a preset area where a center of the pie chart is located, the processor is configured to: determine the standard dividing line according to a diameter line formed by a connecting line between a trajectory point in the second trajectory information intersecting with a point on a circumference of the pie chart and the center of the pie chart: or determine the standard dividing line according to a diameter line formed by a connecting line between a trajectory point in the second trajectory information closest to a point on a circumference of the pie chart and the center of the pie chart.

As an optional embodiment, the graph is a pie chart, and when the second trajectory information does not pass through a preset area where a center of the pie chart is located, the processor is configured to: determine the standard dividing line according to a radius line formed by a connecting line between a trajectory point in the second trajectory information intersecting with a point on a circumference of the pie chart and the center of the pie chart: or determine the standard dividing line according to a radius line formed by a connecting line between a trajectory point in the second trajectory information closest to a point on a circumference of the pie chart and the center of the pie chart.

As an optional embodiment, the processor is further configured to: determine that the standard dividing line enters an editing mode in response to the user's operation: adjust sizes of the divided areas in response to the user's dragging operation on the standard dividing line in the editing mode.

As an optional embodiment, the graph is a pie chart, and the processor is further configured to: adjust sizes of the divided areas in response to the user's dragging operation on an intersection point of the standard dividing line and a circumference of the pie chart in an editing mode.

As an optional embodiment, the processor is further configured to: fill the divided areas with corresponding colors in response to the user's color selection instruction for the divided areas.

As an optional embodiment, the processor is configured to: display trajectory information of the hand-drawn graphic of the user as the standard graphic: generate and display the graph associated with the standard graphic in response to the user's hand-drawn instruction for a dividing line of the standard graphic, where the hand-drawn instruction includes third trajectory information.

As an optional embodiment, the processor is configured to: jump to a graph drawing interface corresponding to a divided graphic obtained after dividing the standard graphic, and display the divided graphic on the graph drawing interface, in response to the user's hand-drawn instruction for the dividing line of the standard graphic.

As an optional embodiment, the processor is configured to: when the standard graphic is a circle, jump to a graph drawing interface corresponding to a pie chart in response to the user's hand-drawn instruction for a dividing line of the circle: or when the standard graphic is a rectangle, jump to a graph drawing interface containing a table in response to the user's hand-drawn instruction for a dividing line of the rectangle.

As an optional embodiment, the processor is configured to: determine a quantity of strokes and a shape feature included in the hand-drawn graphic according to the recognition result: determine the standard graphic according to a graphic specification conforming to the quantity of strokes and the shape feature.

As an optional embodiment, the standard graphic includes at least one of a circle, a triangle, a rectangle, a trapezoid, a rhombus or a pentagon.

As an optional embodiment, when the standard graphic is a circle, the graph associated with the standard graphic includes at least one of a circle, a pie chart, a SWOT chart, a cylinder or a sphere: or when the standard graphic is a triangle, the graph associated with the standard graphic includes at least one of a triangle, a Maslow's pyramid of needs, a blank pyramid diagram or a regular tetrahedron: or when the standard graphic is a rectangle, the graph associated with the standard graphic includes at least one of a rectangle, a bar chart, a KANO model or a cube: or when the standard graphic is a pentagon, the graph associated with the standard graphic includes at least one of a pentagon or a radar chart.

As an optional embodiment, a size of the standard graphic is determined according to coordinate values of trajectory points in the first trajectory information of the hand-drawn graphic of the user.

In a second aspect, an embodiment of the disclosure provides a method for intelligent graphic association, including: obtaining first trajectory information of a hand-drawn graphic of a user: performing graphic recognition on the first trajectory information, and determining a standard graphic corresponding to the hand-drawn graphic according to a recognition result, where the standard graphic conforms to a predefined graphic specification: generating and displaying a graph associated with the standard graphic.

As an optional embodiment, the generating and displaying the graph associated with the standard graphic, includes: displaying a control list of the standard graphic, where the control list includes at least one associative icon related to the standard graphic: generating and displaying the graph associated with the standard graphic in response to the user's instruction to select the associative icon.

As an optional embodiment, the generating and displaying the graph associated with the standard graphic in response to the user's instruction to select the associative icon, includes: in response to the user's instruction to select the associative icon, inserting a graph corresponding to the associative icon into a display interface of the hand-drawn graphic of the user; and/or in response to the user's instruction to select the associative icon, jumping to a graph drawing interface corresponding to the associative icon, and displaying the corresponding graph on the graph drawing interface.

As an optional embodiment, the control list includes a plurality of associative icons related to the standard graphic, and the generating and displaying the graph associated with the standard graphic in response to the user's instruction to select the associative icon, includes: in response to the user's instruction to select one associative icon of the associative icons included in the control list, inserting a graph corresponding to the associative icon into a display interface of the hand-drawn graphic of the user: in response to the user's instruction to select another associative icon included in the control list, jumping to a graph drawing interface corresponding to the associative icon, and displaying a corresponding graph on the graph drawing interface.

As an optional embodiment, the associative icon includes at least one of a pie chart icon, a bar chart icon, or a radar chart icon.

As an optional embodiment, the graph associated with the standard graphic includes a three-dimensional graphic, and the generating and displaying the graph associated with the standard graphic, includes: in response to the user's rotation instruction for the three-dimensional graphic, rotating and displaying the three-dimensional graphic in a direction corresponding to the rotation instruction.

As an optional embodiment, the generating and displaying the graph associated with the standard graphic, includes: generating and displaying the graph associated with the standard graphic in response to an instruction to add a coordinate axis drawn by the user.

As an optional embodiment, the generating and displaying the graph associated with the standard graphic in response to the instruction to add the coordinate axis drawn by the user, includes: jumping to a graph drawing interface of the graph associated with the standard graphic, and displaying the graph on the graph drawing interface, in response to the instruction to add the coordinate axis drawn by the user.

As an optional embodiment, the jumping to the graph drawing interface of the graph associated with the standard graphic and displaying the graph on the graph drawing interface in response to the instruction to add the coordinate axis drawn by the user, includes: when the standard graphic is a circle, jumping to a graph drawing interface corresponding to a pie chart, and displaying the pie chart on the graph drawing interface, in response to the instruction to add the coordinate axis drawn by the user: or when the standard graphic is a rectangle, jumping to a graph drawing interface corresponding to a bar chart, and displaying the bar chart on the graph drawing interface, in response to the instruction to add the coordinate axis drawn by the user: or when the standard graphic is a pentagon, jumping to a graph drawing interface corresponding to a radar chart, and displaying the radar chart on the graph drawing interface, in response to the instruction to add the coordinate axis drawn by the user.

As an optional embodiment, after generating and displaying the graph associated with the standard graphic, the method further includes: editing the graph correspondingly in response to the user's editing instruction for the graph, where the editing instruction includes at least one instruction of dividing the graph or merging a plurality of sub-areas included in the graph.

As an optional embodiment, the editing instruction includes an instruction of dividing the graph, and the editing the graph correspondingly in response to the user's editing instruction for the graph, includes: determining a standard dividing line corresponding to second trajectory information for dividing the graph included in the editing instruction according to the second trajectory information: displaying the second trajectory information as the standard dividing line, to divide the graph by the standard dividing line to obtain a plurality of divided areas.

As an optional embodiment, when the graph is a pie chart, the divided area represents a proportion of a same type of data in data included in the graph: or when the graph is a rectangle, the divided area represents a cell of a table.

As an optional embodiment, the graph is a pie chart, and when the second trajectory information passes through a preset area where a center of the pie chart is located, the determining the standard dividing line corresponding to the second trajectory information, includes: determining the standard dividing line according to a diameter line formed by a connecting line between a trajectory point in the second trajectory information intersecting with a point on a circumference of the pie chart and the center of the pie chart: or determining the standard dividing line according to a diameter line formed by a connecting line between a trajectory point in the second trajectory information closest to a point on a circumference of the pie chart and the center of the pie chart.

As an optional embodiment, the graph is a pie chart, and when the second trajectory information does not pass through a preset area where a center of the pie chart is located, the determining the standard dividing line corresponding to the second trajectory information, includes: determining the standard dividing line according to a radius line formed by a connecting line between a trajectory point in the second trajectory information intersecting with a point on a circumference of the pie chart and the center of the pie chart: or determining the standard dividing line according to a radius line formed by a connecting line between a trajectory point in the second trajectory information closest to a point on a circumference of the pie chart and the center of the pie chart.

As an optional embodiment, the method further includes: determining that the standard dividing line enters an editing mode in response to the user's operation: adjusting sizes of the divided areas in response to the user's dragging operation on the standard dividing line in the editing mode.

As an optional embodiment, the graph is a pie chart, and the method further includes: adjusting sizes of the divided areas in response to the user's dragging operation on an intersection point of the standard dividing line and a circumference of the pie chart in an editing mode.

As an optional embodiment, the method further includes: filling the divided areas with corresponding colors in response to the user's color selection instruction for the divided areas.

As an optional embodiment, the generating and displaying the graph associated with the standard graphic, includes: displaying trajectory information of the hand-drawn graphic of the user as the standard graphic: generating and displaying the graph associated with the standard graphic in response to the user's hand-drawn instruction for a dividing line of the standard graphic, where the hand-drawn instruction includes third trajectory information.

As an optional embodiment, the generating and displaying the graph associated with the standard graphic, includes: jumping to a graph drawing interface corresponding to a divided graphic obtained after dividing the standard graphic, and displaying the divided graphic on the graph drawing interface, in response to the user's hand-drawn instruction for the dividing line of the standard graphic.

As an optional embodiment, the jumping to the graph drawing interface corresponding to the divided graphic obtained after the standard graphic is divided, includes: when the standard graphic is a circle, jumping to a graph drawing interface corresponding to a pie chart in response to the user's hand-drawn instruction for a dividing line of the circle: or when the standard graphic is a rectangle, jumping to a graph drawing interface including a table in response to the user's hand-drawn instruction for a dividing line of the rectangle.

As an optional embodiment, the determining the standard graphic corresponding to the hand-drawn graphic according to the recognition result, includes: determining a quantity of strokes and a shape feature included in the hand-drawn graphic according to the recognition result: determining the standard graphic according to a graphic specification conforming to the quantity of strokes and the shape feature.

As an optional embodiment, the standard graphic includes at least one of a circle, a triangle, a rectangle, a trapezoid, a rhombus or a pentagon.

As an optional embodiment, when the standard graphic is a circle, the graph associated with the standard graphic includes at least one of a circle, a pie chart, a SWOT chart, a cylinder or a sphere: or when the standard graphic is a triangle, the graph associated with the standard graphic includes at least one of a triangle, a Maslow's pyramid of needs, a blank pyramid diagram or a regular tetrahedron: or when the standard graphic is a rectangle, the graph associated with the standard graphic includes at least one of a rectangle, a bar chart, a KANO model or a cube: or when the standard graphic is a pentagon, the graph associated with the standard graphic includes at least one of a pentagon or a radar chart.

As an optional embodiment, a size of the standard graphic is determined according to coordinate values of trajectory points in the first trajectory information of the hand-drawn graphic of the user.

In a third aspect, an embodiment of the disclosure further provides an apparatus for intelligent graphic association, including: a trajectory obtaining unit configured to obtain trajectory information of a hand-drawn graphic of a user: a graphic recognition unit configured to perform graphic recognition on the trajectory information, and determine a standard graphic corresponding to the hand-drawn graphic according to a recognition result, where the standard graphic conforms to a predefined graphic specification: a list display unit configured to generate and display a graph associated with the standard graphic.

In a fourth aspect, an embodiment of the disclosure further provides a computer storage medium storing a computer program thereon, where the program implements the steps of the method described in the second aspect when executed by a processor.

These and other aspects of the disclosure will be more clear and easy to understand in the description of following embodiments.

BRIEF DESCRIPTION OF THE DRAWINGS

In order to illustrate technical solutions in embodiments of the disclosure more clearly, the accompanying drawings which need to be used in describing embodiments will be introduced below briefly. Obviously the accompanying drawings described below are only some embodiments of the disclosure, and other accompanying drawings can also be obtained by those ordinary skilled in the art according to these accompanying drawings without creative labor.

DETAILED DESCRIPTION OF EMBODIMENTS

Figure 1:
FIG. 1 is a schematic diagram of an intelligent interactive display device according to an embodiment of the disclosure.

In order to make objects, technical solutions and advantages of the disclosure clearer, the disclosure will be further illustrated below in details with reference to the accompanying drawings. Obviously the described embodiments are merely a part of embodiments of the disclosure but not all embodiments. Based upon embodiments in the disclosure, all of other embodiments obtained by those ordinary skilled in the art without creative work pertain to the protection scope of the disclosure.

The term "and/or" in embodiments of the disclosure describes the association relationship of associated objects, indicating that there may be three relationships, for example, A and/or B may represent: only A, both A and B, and only B. The character "/" generally indicates that the associated objects have a kind of "or" relationship.

Application scenarios described in embodiments of the disclosure are intended to illustrate technical solutions of embodiments of the disclosure more clearly, and do not constitute a limitation on the technical solutions provided in embodiments of the disclosure. As can be known by those ordinary skilled in the art, with the appearance of new application scenarios, the technical solutions provided in embodiments of the disclosure are also applicable to similar technical problems. Here, in the description of the disclosure, "a plurality of" means two or more unless otherwise specified.

Embodiment 1: The conference is one of the most common forms of work. But, with the continuous development of the times and the continuous advancement of science and technology, the traditional conference mode is no longer suitable for the requirements of modern office, and the importance of conference efficiency and interactive experience in the enterprise conference emerges gradually. Thus, the smart conference is proposed. The smart conference is an office product that integrates various devices such as an electronic whiteboard, a computer and a remote conference terminal, and has multiple functions such as interactive smart whiteboard. With the advancement of high-precision positioning technologies such as infrared, electromagnetic and capacitive touch, the electronic whiteboard can already realize touch writing. When the electronic whiteboard is used for conferences, there is often a need for graphical presentation. However, the current electronic whiteboard products need to hand-draw various graphics when making such graphs, such as histograms, pie charts, etc. Due to the low efficiency of hand-drawing, it is difficult to guarantee the accuracy of graphic drawing, thus causing the great trouble to the conferees and the subsequent processing of graphic array.

An intelligent interactive display device according to an embodiment of the disclosure applies a method of intelligent graphic association, where a corresponding standard graphic is generated according to a hand-drawn graphic of a user, and association is performed based on the standard graphic, and finally a control list is displayed for the user to make a choice, realizing the method of transforming the hand-drawn graphic into an intelligent drawn graphic, and effectively improving the user experience.

It should be noted that the intelligent interactive display device in this embodiment refers to a large-size (generally more than 50 inches) intelligent interactive display device with a touch handwriting function; and the writing programs such as electronic whiteboard can be installed on this intelligent interactive display device. The user can use a finger, an active pen or a passive pen to write, draw graphics, etc. on the intelligent interactive display device. The intelligent interactive display device may include a Liquid Crystal Display (LCD), an Organic Electroluminescence Display (OLED), electronic ink or other display modules, and may display the handwriting and drawing in real time.

As shown in FIG. 1, an embodiment of the disclosure provides an intelligent interactive display device, including a display screen 100 and a control circuit 101, where: the display screen 100 is configured to display content: the control circuit 101 includes a processor and a memory, the memory is configured to store a program executable by the processor, and the processor is configured to read the program in the memory and perform following steps: obtaining first trajectory information of a hand-drawn graphic of a user: performing graphic recognition on the first trajectory information, and determining a standard graphic corresponding to the hand-drawn graphic according to a recognition result, where the standard graphic conforms to a predefined graphic specification: generating and displaying a graph associated with the standard graphic.

In this embodiment, the user uses a finger or a stylus to draw a graphic on a display, trajectory information of the hand-drawn graphic of the user is obtained in real time, and graphic recognition is performed on the trajectory information. The recognition result includes one of different types of graphics. A standard graphic similar to the hand-drawn graphic of the user is obtained based on the recognition result. For example, if the user hand-draws a non-standard circle, the recognition result is a circle, and then the standard graphic is determined to be a circle (regular circle). That is, after the user hand-draws the graphic, the graph associated with the standard graphic may be displayed according to the standard graphic obtained by recognizing the user's first trajectory information, to provide the user with more choices and improve the user experience.

In some implementations, this embodiment provides a method for displaying a control list, and a user can trigger execution of a corresponding function based on an associative icon in the displayed control list. The specific implementation is as follows: displaying a control list of the standard graphic, where the control list includes at least one associative icon related to the standard graphic: generating and displaying the graph associated with the standard graphic in response to the user's instruction to select the associative icon.

In an implementation, the user uses a finger or a stylus to draw a graphic on the display, the trajectory information of the hand-drawn graphic of the user is obtained in real time, the graphic recognition is performed on the trajectory information, a standard graphic similar to the hand-drawn graphic of the user is obtained based on the recognition result, and finally the user is provided with a multi-choice control list based on the standard graphic. The association may be performed based on the hand-drawn graphic of the user, the associative icons obtained based on the hand-drawn graphic of the user are provided to the user for selection, and the user may select any associative icon in the control list, improving the user experience.

In some embodiments, after the associative icon included in the control list in this embodiment is selected by the user, different commands may be executed by inserting or jumping, in any one or more of the following ways.

In a first way: in response to the user's instruction to select the associative icon, inserting a graph corresponding to the associative icon into a display interface of the hand-drawn graphic of the user.

In this way, the graph corresponding to the associative icon may be inserted at the position of the hand-drawn graphic of the user or at a preset position, which is not limited too much in this embodiment. Optionally, the inserted graph is an editable picture.

In a second way: in response to the user's instruction to select the associative icon, jumping to a graph drawing interface corresponding to the associative icon, and displaying a corresponding graph on the graph drawing interface.

In this way, after the user selects the associative icon, it is possible to jump to the corresponding graph drawing interface, and also edit the graph displayed on the graph drawing interface.

In some embodiments, the associative icon includes at least one of a pie chart icon, a bar chart icon or a radar chart icon in the two ways. For example, after the user clicks the pie chart icon, the pie chart is inserted: or a pie chart drawing interface is jumped to.

In some embodiments, when the control list includes a plurality of associative icons related to the standard graphic, corresponding display may be performed when selecting a different associative icon: 1) in response to the user's instruction to select one associative icon of the associative icons included in the control list, inserting a graph corresponding to the associative icon into a display interface of the hand-drawn graphic of the user: 2) in response to the user's instruction to select another associative icon included in the control list, jumping to a graph drawing interface corresponding to the associative icon, and displaying a corresponding graph on the graph drawing interface.

The standard graphic in this embodiment includes at least one of a circle, a triangle, a rectangle, a trapezoid, a rhombus or a pentagon. The triangle includes at least one of an equilateral triangle, an obtuse triangle, an acute triangle, or a right triangle.

Figure 2:
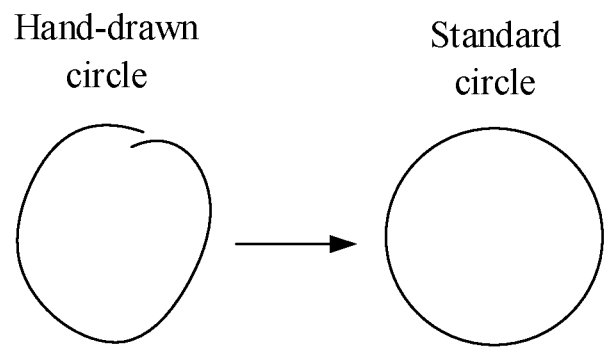
FIG. 2 is a schematic diagram of a corresponding relationship between a first hand-drawn graphic and a standard graphic according to an embodiment of the disclosure.

In some embodiments, as shown in FIG. 2, this embodiment provides a schematic diagram of a corresponding relationship between a first hand-drawn graphic and a standard graphic. When the user draws a circle, a recognition result of the circle is obtained after performing graphic recognition on trajectory information of the hand-drawn circle, and then the standard graphic is determined as a circle.

Optionally, when the standard graphic is a circle, the graph associated with the standard graphic includes at least one of a circle, a pie chart, a SWOT chart, a cylinder or a sphere. The control list of the standard graphic includes at least one of a circle, a pie chart, a SWOT chart, a cylinder or a sphere.

In an implementation, when the user draws a circle on the display screen, a control list is displayed on the interface where the hand-drawn circle is located, where the control list includes a circle, a pie chart, a SWOT chart, a cylinder or a sphere. The user can select the graphic he/she/she wants to draw by clicking, etc., to automatically generate an associative icon.

Figure 3:
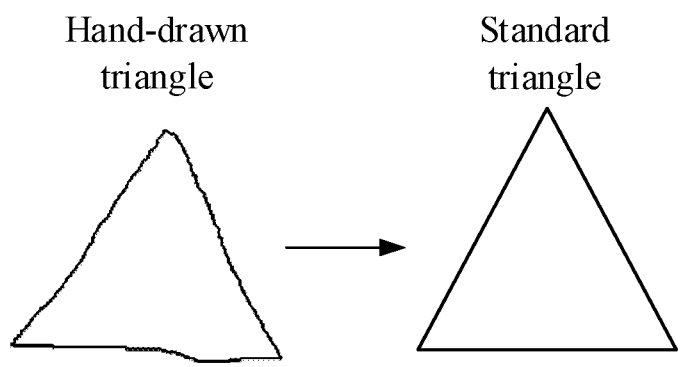
FIG. 3 is a schematic diagram of a corresponding relationship between a second hand-drawn graphic and a standard graphic according to an embodiment of the disclosure.

In some embodiments, as shown in FIG. 3, this embodiment provides a schematic diagram of a corresponding relationship between a second hand-drawn graphic and a standard graphic. When the user draws a triangle, the recognition result of the triangle is obtained after performing the graphic recognition on the trajectory information of the hand-drawn triangle, and then the standard graphic is determined as a triangle.

Optionally, when the standard graphic is a triangle, the graph associated with the standard graphic includes at least one of a triangle, a Maslow's pyramid of needs, a blank pyramid diagram or a regular tetrahedron. The control list of the standard graphic includes at least one of a triangle, a Maslow's pyramid of needs, a blank pyramid diagram or a regular tetrahedron.

In an implementation, when the user draws a triangle on the display screen, a control list is displayed on the interface where the hand-drawn triangle is located. The control list includes a triangle, a Maslow's pyramid of needs, a blank pyramid diagram or a regular tetrahedron. The user can select the graphic he/she/she wants to draw by clicking, etc., to automatically generate an associative icon.

Figure 4:
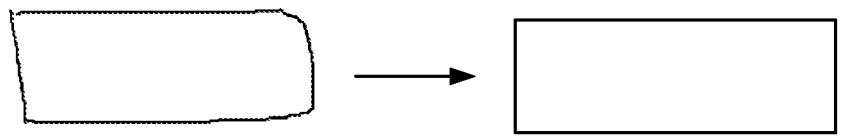
FIG. 4 is a schematic diagram of a corresponding relationship between a third hand-drawn graphic and a standard graphic according to an embodiment of the disclosure.

In some embodiments, as shown in FIG. 4, this embodiment provides a schematic diagram of a corresponding relationship between a third hand-drawn graphic and a standard graphic. When the user draws a rectangle, the recognition result of the rectangle is obtained after performing the graphic recognition on the trajectory information of the hand-drawn rectangle, and then the standard graphic is determined as a rectangle.

Optionally, when the standard graphic is a rectangle, the graph associated with the standard graphic includes at least one of a rectangle, a bar chart, a KANO model or a cube. The control list of the standard graphic includes at least one of a rectangle, a bar chart, a KANO model or a cube.

In an implementation, when the user draws a rectangle on the display screen, a control list is displayed on the interface where the hand-drawn rectangle is located, where the control list includes a rectangle, a bar chart, a KANO model or a cube. The user can select the graphic he/she/she wants to draw by clicking, etc., to automatically generate an associative icon.

Figure 5:
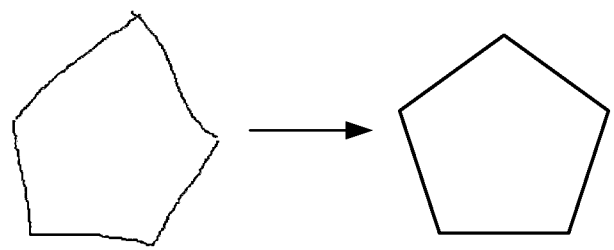
FIG. 5 is a schematic diagram of a corresponding relationship between a fourth hand-drawn graphic and a standard graphic according to an embodiment of the disclosure.

In some embodiments, as shown in FIG. 5, this embodiment provides a schematic diagram of a corresponding relationship between a fourth hand-drawn graphic and a standard graphic. When the user draws a pentagon, the recognition result of the pentagon is obtained after performing the graphic recognition on the trajectory information of the hand-drawn pentagon, and then the standard graphic is determined as a pentagon.

Optionally, when the standard graphic is a pentagon, the graph associated with the standard graphic includes at least one of a pentagon or a radar chart; and the control list of the standard graphic includes at least one of a pentagon or a radar chart.

In an implementation, when the user draws a pentagon on the display screen, a control list is displayed on the interface where the hand-drawn pentagon is located, where the control list includes a pentagon or a radar chart. The user can select the graphic he/she wants to draw by clicking, etc., to automatically generate an associative icon.

Figure 6:
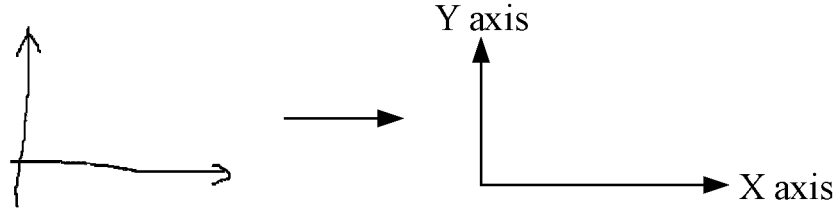
FIG. 6 is a schematic diagram of a corresponding relationship between a fifth hand-drawn graphic and a standard graphic according to an embodiment of the disclosure.

In some embodiments, as shown in FIG. 6, this embodiment provides a schematic diagram of a corresponding relationship between a fifth hand-drawn graphic and a standard graphic. When the user draws a coordinate axis, the recognition result of the coordinate axis is obtained after performing the graphic recognition on the trajectory information of the hand-drawn coordinate axis, and then the standard graphic is determined as a two-dimensional coordinate axis.

Optionally, when the standard graphic is a coordinate axis, the control list of the standard graphic includes at least one of a two-dimensional coordinate axis or a three-dimensional coordinate axis.

In an implementation, when the user draws a coordinate axis on the display screen, a control list is displayed on the interface where the hand-drawn coordinate axis is located, where the control list includes a two-dimensional coordinate axis or a three-dimensional coordinate axis. The user can select the graphic he/she/she wants to draw by clicking, etc., to automatically generate an associative icon.

In some embodiments, the graph associated with the standard graphic may also be displayed in the following way: generating and displaying the graph associated with the standard graphic in response to an instruction to add a coordinate axis drawn by the user.

In an implementation, after the user draws a coordinate axis, if the user hand-draws a graphic again, then a graph associated with the standard graphic obtained by recognizing the hand-drawn graphic is generated and displayed: or after the user draws a graphic and a coordinate axis, a graph associated with the standard graphic obtained by recognizing the hand-drawn graphic is generated and displayed.

In some embodiments, it is also possible to jump to a graph drawing interface of the graph associated with the standard graphic, and display the graph on the graph drawing interface, in response to the instruction to add the coordinate axis drawn by the user.

In some embodiments, according to different standard graphics, there are any one or more of the following cases: (1) when the standard graphic is a circle, jumping to a graph drawing interface corresponding to a pie chart, and displaying the pie chart on the graph drawing interface, in response to the instruction to add the coordinate axis drawn by the user: (2) when the standard graphic is a rectangle, jumping to a graph drawing interface corresponding to a bar chart, and displaying the bar chart on the graph drawing interface, in response to the instruction to add the coordinate axis drawn by the user: (3) when the standard graphic is a pentagon, jumping to a graph drawing interface corresponding to a radar chart, and displaying the radar chart on the graph drawing interface, in response to the instruction to add the coordinate axis drawn by the user.

In some embodiments, the size of the standard graphic is determined according to the size of the hand-drawn graphic of the user, and the size of the hand-drawn graphic of the user is determined according to coordinate values of trajectory points in the trajectory information.

In an implementation, a standard graphic or an associative icon of the same or approximate size may be generated according to the size of the hand-drawn graphic of the user.

In some embodiments, the display position of the standard graphic or the display position of the associative icon is consistent with the position of the hand-drawn graphic of the user on the display screen.

In some embodiments, the standard graphic corresponding to the hand-drawn graphic is determined according to the recognition result in the following way: determining a quantity of strokes and a shape feature included in the hand-drawn graphic according to the recognition result; and determining the standard graphic according to a graphic specification conforming to the quantity of strokes and the shape feature.

Here, the shape feature in this embodiment is used to represent the seal, inner angle, side length, parallelism, etc. of the graphic, and may be defined according to actual requirements, which is not limited too much in this embodiment.

This embodiment provides a graphic recognition specification, as follows.

(1) The standard graphic determined according to the recognition result is a circle.

Here, the quantity of strokes determined according to the recognition result is 1, and the shape features include: an appropriate spacing may be left at the seal: there may be an appropriate intersection in circle at the seal; and the graphic circle should be relatively round.

Figure 7:
FIG. 7 is a schematic diagram of hand-drawn circles that can be recognized as circles according to an embodiment of the disclosure.
Figure 7:
Figure 7:
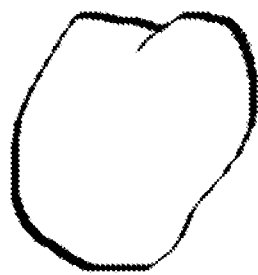
Figure 7:
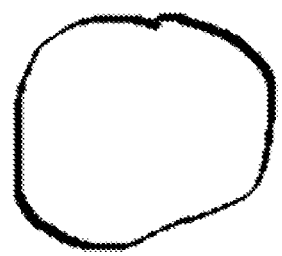

As shown in FIG. 7, FIG. 7 is a schematic diagram of hand-drawn circles that can be recognized as circles according to this embodiment.

(2) The standard graphic determined according to the recognition result is a triangle.

Here, the quantity of strokes determined according to the recognition result is one of 1, 2 or 3; and the shape features include: the minimum included angle in an obtuse triangle should not be less than 25 degrees: taking an included angle of 30 degrees between the longest side of the triangle and the horizontal plane as the limit, the triangle is recognized as a regular triangle when the included angle does not exceed 30 degrees, and the included angle of the standard graphic is determined according to the included angle of the actual triangle when the included angle exceeds 30 degrees.

Figure 8:
FIG. 8 is a schematic diagram of hand-drawn triangles that can be recognized as triangles according to an embodiment of the disclosure.
Figure 8:

As shown in FIG. 8, FIG. 8 is a schematic diagram of hand-drawn triangles that can be recognized as triangles according to this embodiment.

(3) The standard graphic determined according to the recognition result is a rectangle.

Here, the quantity of strokes determined according to the recognition result is one of 1, 2, 3 or 4; and the shape features include: parallel to the horizontal plane, there may be at most four included angles with a small writing arc; and opposite sides should be parallel within a certain range, and adjacent sides should be vertical within a certain range.

Figure 9:
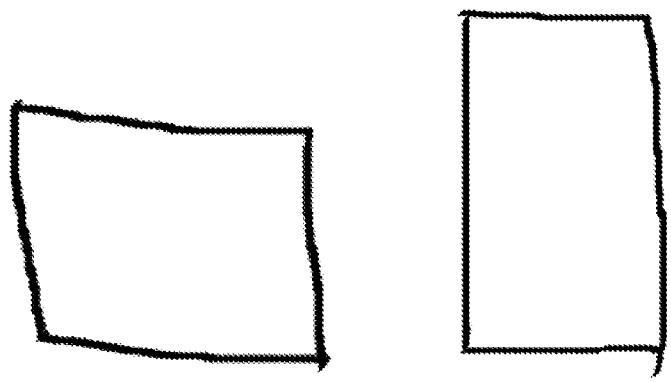
FIG. 9 is a schematic diagram of hand-drawn rectangles that can be recognized as rectangles according to an embodiment of the disclosure.

As shown in FIG. 9, FIG. 9 is a schematic diagram of hand-drawn rectangles that can be recognized as rectangles according to this embodiment.

(4) The standard graphic determined according to the recognition result is a trapezoid.

Here, the quantity of strokes determined according to the recognition result is one of 1, 2, 3 or 4; and the shape features include: parallel to the horizontal plane: the ratio of the shortest side to the longest side is in a range of [⅓, ⅘]: when a line segment of a long base is relatively short, the trapezoid can be ignored if it is not easy to distinguish whether the graphic is a triangle according to the above ratio: a right-angled trapezoid needs to have two right angles.

Figure 10:
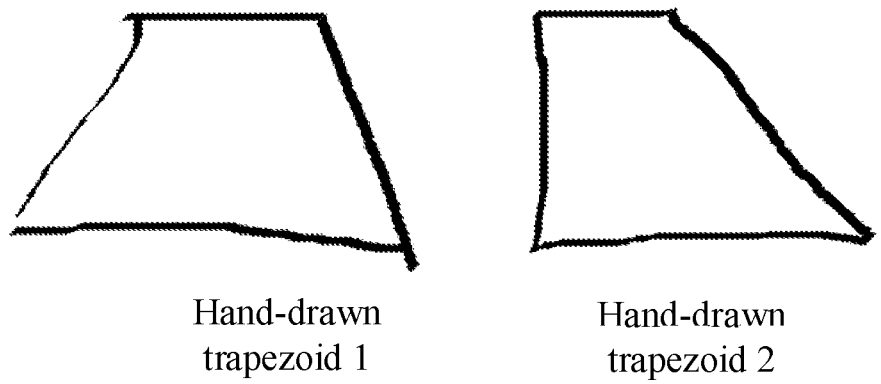
FIG. 10 is a schematic diagram of hand-drawn trapezoids that can be recognized as trapezoids according to an embodiment of the disclosure.

As shown in FIG. 10, FIG. 10 is a schematic diagram of hand-drawn trapezoids that can be recognized as trapezoids according to this embodiment.

(5) The standard graphic determined according to the recognition result is a rhombus.

Here, the quantity of strokes determined according to the recognition result is one of 2, 3 or 4; and the shape features include: four sides of a regular rhombus are approximately equal within a certain range, and inner angles are approximately equal within a certain range.

Figure 11:
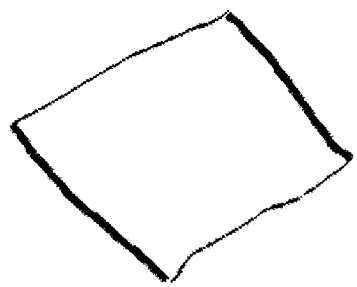
FIG. 11 is a schematic diagram of a hand-drawn rhombus that can be recognized as a rhombus according to an embodiment of the disclosure.

As shown in FIG. 11, FIG. 11 is a schematic diagram of a hand-drawn rhombus that can be recognized as a rhombus according to this embodiment.

(6) The standard graphic determined according to the recognition result is a pentagon.

Here, the quantity of strokes determined according to the recognition result is one of 2, 3, 4 or 5; and the shape feature includes: five sides of a regular pentagon are approximately equal within a certain range.

Figure 12:
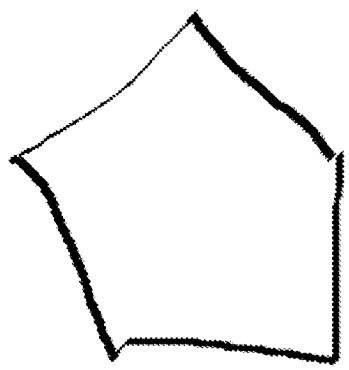
FIG. 12 is a schematic diagram of a hand-drawn pentagon that can be recognized as a pentagon according to an embodiment of the disclosure.

As shown in FIG. 12, FIG. 12 is a schematic diagram of a hand-drawn pentagon that can be recognized as a pentagon according to this embodiment.

It should be noted that, in this embodiment, for a graphic completed with a plurality of strokes, there must be connection points between strokes, to determine that the user hand-draws the same graphic. Also, it is necessary to ensure that a starting point of a polygon is at a corner, to determine that the user hand-draws a polygon.

Optionally, the average accuracy rate of the graphic recognition algorithm in this embodiment is greater than or equal to 90%, the mis-recognition and rejection rate is less than or equal to 10%, and the algorithm response time is 30 ms/stroke. The response time refers to the time during which the data of one stroke is transmitted from the application layer to the algorithm and then the algorithm transmits the result to the upper layer.

In some embodiments, this embodiment further provides a method for displaying a standard graphic, as follows: displaying trajectory information of the hand-drawn graphic of the user as the standard graphic: generating and displaying the graph associated with the standard graphic in response to the user's hand-drawn instruction for a dividing line of the standard graphic, where the hand-drawn instruction includes third trajectory information.

Optionally, in response to the user's first selection instruction, the trajectory information of the hand-drawn graphic of the user is displayed as the standard graphic.

In an implementation, the user's first selection instruction includes, but is not limited to, one of click, double-click, single-click and slide operations. For example, when the user clicks on a display interface other than the control list, the user triggers to generate a standard graphic at the position of the hand-drawn graphic of the user, thereby replacing previously hand-drawn trajectory information.

In some embodiments, after the trajectory information of the hand-drawn graphic of the user is displayed as the standard graphic, the graph associated with the standard graphic is generated and displayed in response to the user's hand-drawn instruction for a dividing line of the standard graphic, where the hand-drawn instruction includes the third trajectory information. The specific implementation steps are as follows: jumping to a graph drawing interface corresponding to a divided graphic obtained after dividing the standard graphic, and displaying the divided graphic on the graph drawing interface, in response to the user's hand-drawn instruction for the dividing line of the standard graphic.

In some embodiments, when the standard graphic is a circle, a graph drawing interface corresponding to a pie chart is jumped to, in response to the user's hand-drawn instruction for a dividing line of the circle. In an implementation, taking the pie chart as an example, after the user hand-draws the dividing line on the generated circle, the pie chart drawing interface is jumped to, and the pie chart is displayed on the pie chart drawing interface.

In some embodiments, when the standard graphic is a rectangle, a graph drawing interface containing a table is jumped to, in response to the user's hand-drawn instruction for a dividing line of the rectangle. In an implementation, the user can select a type of graph on the graph drawing interface including the table. When selecting to drawing a pie chart, the pie chart is drawn according to the data in the table: when a bar chart is selected, the bar chart is drawn according to the data in the table, which is not limited too much in this embodiment.

In some embodiments, after displaying the control list of the standard graphic, this embodiment further provides a method for displaying a graph corresponding to an associative icon. The specific implementation process is as follows.

In response to the user's second selection instruction for an associative icon in the control list, the trajectory information of the hand-drawn graphic of the user is displayed as a graph corresponding to the associative icon.

In an implementation, the user's second selection instruction includes, but is not limited to, one of click, double-click, single-click and slide operations. For example, when the user clicks an associative icon in the control list, a graph corresponding to the associative icon is triggered to be generated at the position of the hand-drawn graphic of the user, thereby replacing previously hand-drawn trajectory information. Here, the generated graph corresponding to the associative icon can be displayed by inserting or jumping. For example, taking the graph corresponding to the associative icon being a pie chart as an example, the graph is displayed by inserting the pie chart or by jumping to the pie chart drawing interface.

In some embodiments, when the graph associated with the standard graphic includes a three-dimensional graphic, in response to the user's rotation instruction for the three-dimensional graphic, the three-dimensional graphic is rotated and displayed in a direction corresponding to the rotation instruction.

In some embodiments, when the graph corresponding to the associative icon corresponding to the second selection instruction is a three-dimensional graphic, this embodiment further provides a rotation method, as follows: in response to the user's operation instruction for the three-dimensional graphic, displaying coordinate axes of the three-dimensional graphic: in response to the user's rotation instruction for the coordinate axes of the three-dimensional graphic, rotating and displaying the associative icon in the direction corresponding to the rotation instruction.

In an implementation, for example, the associative icon selected by the user is a cylinder or sphere, and the 3D rendering model of the cylinder or sphere is inserted at the original hand-drawn position, from the viewing angle of the front view by default; and x, y and z axes appear after clicking or dragging (the starting position triggered by the gesture action is within the coordinates of the 3D model) the 3D rendering model. One of the axes is selected and then the corresponding direction is dragged to rotate the viewing angle of the model in this direction. The viewing angle corresponding to only one axis can be rotated at a time.

Optionally, the three-dimensional graphic in this embodiment is a model processed by the 3D rendering technology.

In some embodiments, this embodiment further provides a method for editing the displayed graph, and the specific implementation is as follows: editing the graph correspondingly in response to the user's editing instruction for the graph, where the editing instruction includes at least one instruction of dividing the graph or merging a plurality of sub-areas included in the graph.

In some embodiments, the user can designate any two areas in the graph to be merged according to requirements, and this embodiment does not set too many limitations on the specific merge method.

In some embodiments, after displaying the trajectory information of the hand-drawn graphic of the user as the graph corresponding to the associative icon corresponding to the second selection instruction, the graph corresponding to the associative icon may also be edited. The specific implementation step is as follows: editing the graph correspondingly in response to the user's editing instruction for the graph, where the editing instruction includes at least one instruction of dividing the graph or merging a plurality of sub-areas included in the graph.

In some embodiments, the editing instruction includes an instruction of dividing the graph, and the specific dividing method is as follows: determining a standard dividing line corresponding to second trajectory information for dividing the graph included in the editing instruction according to the second trajectory information: displaying the second trajectory information as the standard dividing line, to divide the graph by the standard dividing line to obtain a plurality of divided areas.

In an implementation, the standard dividing line corresponding to the hand-drawn dividing line is determined according to the second trajectory information of the graph dividing line corresponding to the associative icon hand-drawn by the user.

The second trajectory information is displayed as the standard dividing line, to divide the graph corresponding to the associative icon by the standard dividing line to obtain a plurality of divided areas.

In some embodiments, if the graph is a pie chart, the divided area represents a proportion of a same type of data in data included in the graph: if the graph is a rectangle, the divided area represents a cell of a table.

In some embodiments, taking the displayed graph being a pie chart as an example, any of the following dividing cases are included.

Case 1: If the second trajectory information passes through a preset area where a center of the pie chart is located, the standard dividing line is determined according to a diameter line formed by a connecting line between a trajectory point in the second trajectory information intersecting with a point on a circumference of the pie chart and the center of the pie chart.

Case 2: If the second trajectory information passes through a preset area where the center of the pie chart is located, the standard dividing line is determined according to a diameter line formed by a connecting line between a trajectory point in the second trajectory information closest to a point on a circumference of the pie chart and the center of the pie chart.

Case 3: If the second trajectory information does not pass through a preset area where the center of the pie chart is located, the standard dividing line is determined according to a radius line formed by a connecting line between a trajectory point in the second trajectory information intersecting with a point on a circumference of the pie chart and the center of the pie chart.

Case 4: If the second trajectory information does not pass through a preset area where the center of the pie chart is located, the standard dividing line is determined according to a radius line formed by a connecting line between a trajectory point in the second trajectory information closest to a point on a circumference of the pie chart and the center of the pie chart.

Figure 13A:
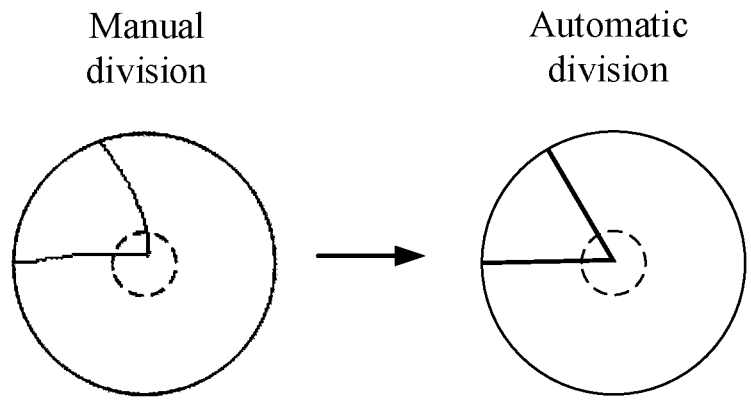
FIG. 13A is a schematic diagram of comparison between manual division and automatic division of a circle according to an embodiment of the disclosure.

As shown in FIG. 13A, this embodiment also provides a schematic diagram of comparison between manual division and automatic division of the pie chart. In an implementation, the user continues to draw on the displayed pie chart and divides the pie chart by hand-drawing a dividing line, a standard dividing line is generated according to the second trajectory information of the dividing line hand-drawn by the user, and the second trajectory information is displayed as the standard dividing line.

Here, if the path formed by the trajectory points in the second trajectory information does not pass through a preset range centered on the center of the circle, the standard dividing line is determined by taking a trajectory point in the second trajectory information within a preset range centered on a point on the circumference as the starting point, and a trajectory point within the preset range centered on the center of the circle as the ending point: or, the standard dividing line is determined by taking a trajectory point in the second trajectory information within the preset range centered on the point on the circumference as the ending point, and a trajectory point within the preset range centered on the center of the circle as the starting point.

Figure 13B:
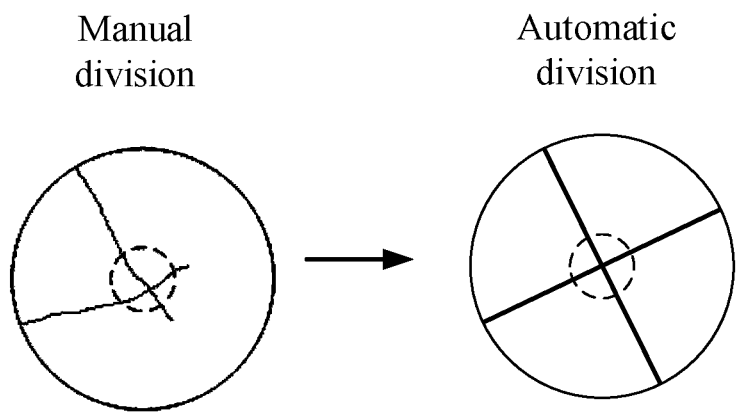
FIG. 13B is a schematic diagram of comparison between manual division and automatic division of a circle according to an embodiment of the disclosure.

As shown in FIG. 13B, a schematic diagram of comparison between manual division and automatic division of the pie chart is provided. In an implementation, the user continues to draw on the displayed pie chart and divides the pie chart by hand-drawing a dividing line, a standard dividing line is generated according to the second trajectory information of the dividing line hand-drawn by the user, and the second trajectory information is displayed as the standard dividing line.

Here, if the path formed by the trajectory points in the second trajectory information passes through a preset range centered on the center of the circle, the standard dividing line is determined by taking a trajectory point in the second trajectory information within a preset range centered on a point on the circumference as the starting point, and an intersection point between a straight line formed by the starting point along the direction of the center of the circle and the circumference as the ending point: or, the standard dividing line is determined by taking a trajectory point in the second trajectory information within the preset range centered on the point on the circumference as the ending point, and an intersection point between the straight line formed by the ending point along the direction of the center of the circle and the circumference as the starting point.

Figure 14:
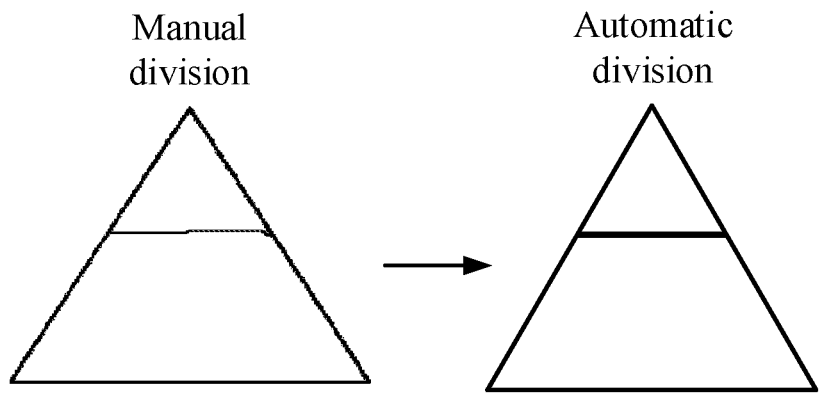
FIG. 14 is a schematic diagram of comparison between manual division and automatic division of a triangle according to an embodiment of the disclosure.

As shown in FIG. 14, a schematic diagram of comparison between manual division and automatic division of the triangle is provided. In an implementation, the user continues to draw on the displayed triangle and divides the triangle by hand-drawing a dividing line, a standard dividing line is generated according to the second trajectory information of the dividing line hand-drawn by the user, and the second trajectory information is displayed as the standard dividing line.

Here, the standard dividing line is determined by taking a trajectory point in the second trajectory information within a preset range centered on a point on one side of the triangle as the starting point, and a trajectory point within a preset range centered on a point on another side of the triangle as the ending point.

Figure 15:
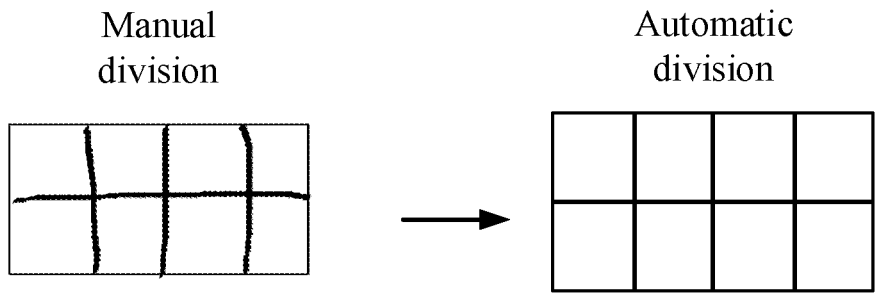
FIG. 15 is a schematic diagram of comparison between manual division and automatic division of a rectangle according to an embodiment of the disclosure.

As shown in FIG. 15, a schematic diagram of comparison between manual division and automatic division of the rectangle is provided. In an implementation, the user continues to draw on the displayed rectangle and divides the rectangle by hand-drawing a dividing line, a standard dividing line is generated according to the second trajectory information of the dividing line hand-drawn by the user, and the second trajectory information is displayed as the standard dividing line.

In some embodiments, this embodiment may also adjust sizes of the divided areas, and the specific implementation is as follows.

1) In response to the user's dragging operation on the standard dividing line, the sizes of the divided areas are adjusted.

In some embodiments, in response to the user's operation, it is determined that the standard dividing line enters an editing mode.

The sizes of the divided areas are adjusted in response to the user's dragging operation on the standard dividing line in the editing mode.

In some embodiments, the graph is a pie chart, and in response to the user's dragging operation on the intersection point of the standard dividing line and the circumference of the pie chart in the editing mode, the sizes of the divided areas are adjusted.

Figure 16A:
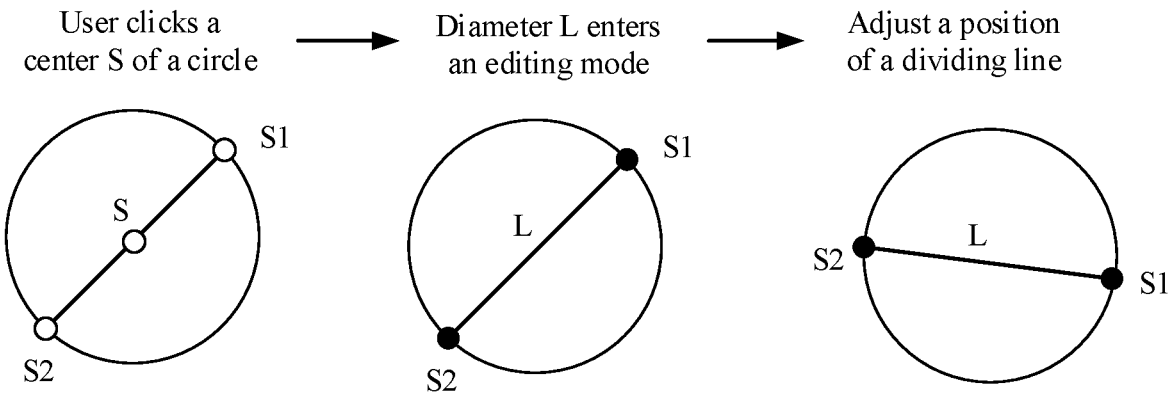
FIG. 16A is a schematic diagram of adjusting divided areas according to an embodiment of the disclosure.

As shown in FIG. 16A, this embodiment provides a schematic diagram of adjusting the divided areas, where a circle or a pie chart is taken as an example. In an implementation, the user can click (including click, long press, double-click) a center S of the circle to make the diameter L enter the editing mode, press and hold the point S1 or S2, and rotate clockwise or counterclockwise, to adjust a position of the standard dividing line.

Figure 16B:
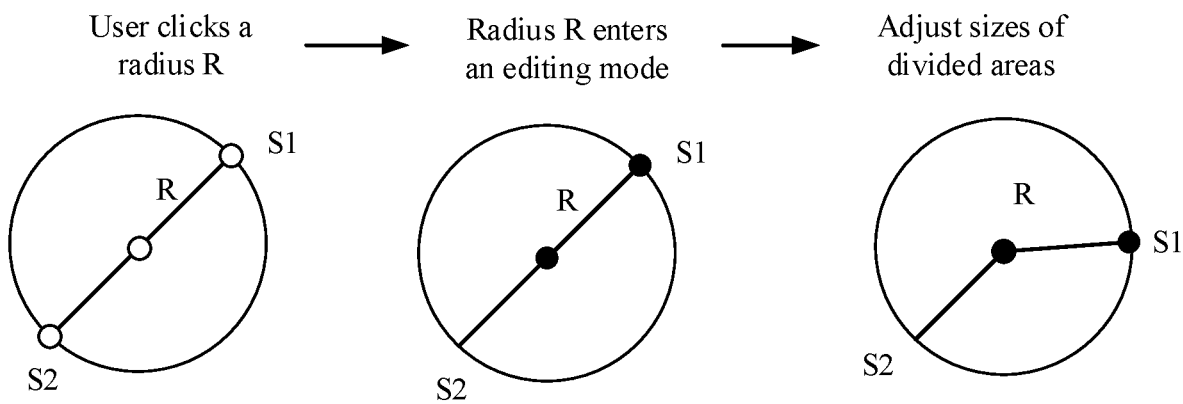
FIG. 16B is a schematic diagram of adjusting divided areas according to an embodiment of the disclosure.

As shown in FIG. 16B, this embodiment provides a schematic diagram of adjusting the divided areas, where a circle or a pie chart is taken as an example. In an implementation, the user can click (including click, long press, double-click) a radius R to make the radius R enter the editing mode, press and hold the point S1 or S2, and rotate clockwise or counterclockwise, to adjust the sizes of the divided areas.

2) In response to writing trajectory information written by the user on the divided areas, the sizes of the divided areas are adjusted according to the recognition result of the writing track information.

Figure 17:
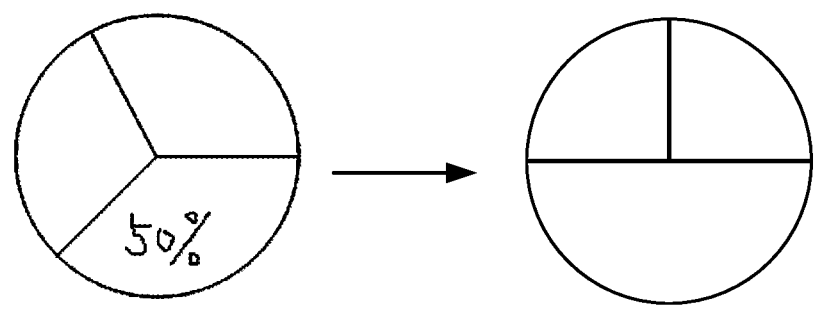
FIG. 17 is a schematic diagram of adjusting divided areas according to an embodiment of the disclosure.

As shown in FIG. 17, this embodiment provides a schematic diagram of adjusting the divided areas, where a circle or a pie chart is taken as an example. In an implementation, the user can write data on the divided areas to represent the sizes of the divided areas, so that the sizes of the divided areas are adjusted according to the written data.

In some embodiments, this embodiment also provides a color filling method. In an implementation, in response to the user's color selection instruction for the divided areas, the divided areas are filled with the corresponding colors.

In some embodiments, the process of recognizing the trajectory information of the hand-drawn graphic of the user in this embodiment is to send the trajectory points in the trajectory information of the hand-drawn graphic of the user to the graphic recognition algorithm in the form of an array for calculation. Here, one stroke is completed every time the user writes down or lifts up a pen, except for the handwriting points that are too long or too short. The trajectory points in the user's trajectory information are used to recognize and determine the graphic that the user wants to draw: In an implementation, the handwriting information corresponding to each stroke of the user can be recognized, and the recognition algorithm outputs an associative icon to the UI for recommendation of the associative icon. After the user selects the associative icon, the application layer performs secondary editing on the selected associative icon to display a graph corresponding to the associative icon.

In some embodiments, this embodiment also provides a method for determining whether to take the trajectory points in the user's trajectory information as an array for graphic recognition. The specific judgment rules are as follows.

1) Determining from time: determining whether to take the current trajectory point and the previous trajectory point as an array for graphic recognition according to an interval between writing time of the current trajectory point and the starting time of the previous trajectory point.

2) Determining from distance: determining whether to take the current trajectory point and the previous trajectory point as an array for graphic recognition according to a position of the current trajectory point and a position of the previous trajectory point.

For example, the trajectory points included in an array can be determined by the following determining rule. It is assumed that a is the start point and b is the end point after the user writes a stroke of 1, and c is the start point for a next stroke of trajectory 2: dis represents the Euclidean distance, and timeInterval represents the time interval.

If (the timeInterval between the writing time of the current handwriting 2 and the starting time of the previous handwriting 1>1s):
    Reset1 (the current handwriting 2 is regarded as the first stroke of the graphic, and all variables become default values)
    elseIf(dis(a,c)>20 pixels and dis (b,c)>20 pixels):
    Graphic category: (current handwriting 2) not recognized
    Reset2 (except that the stroke count variable is not cleared (to count the quantity of strokes of one target), other variables become default values (to cut off the connection between the third stroke and the first stroke)).

Figure 18:
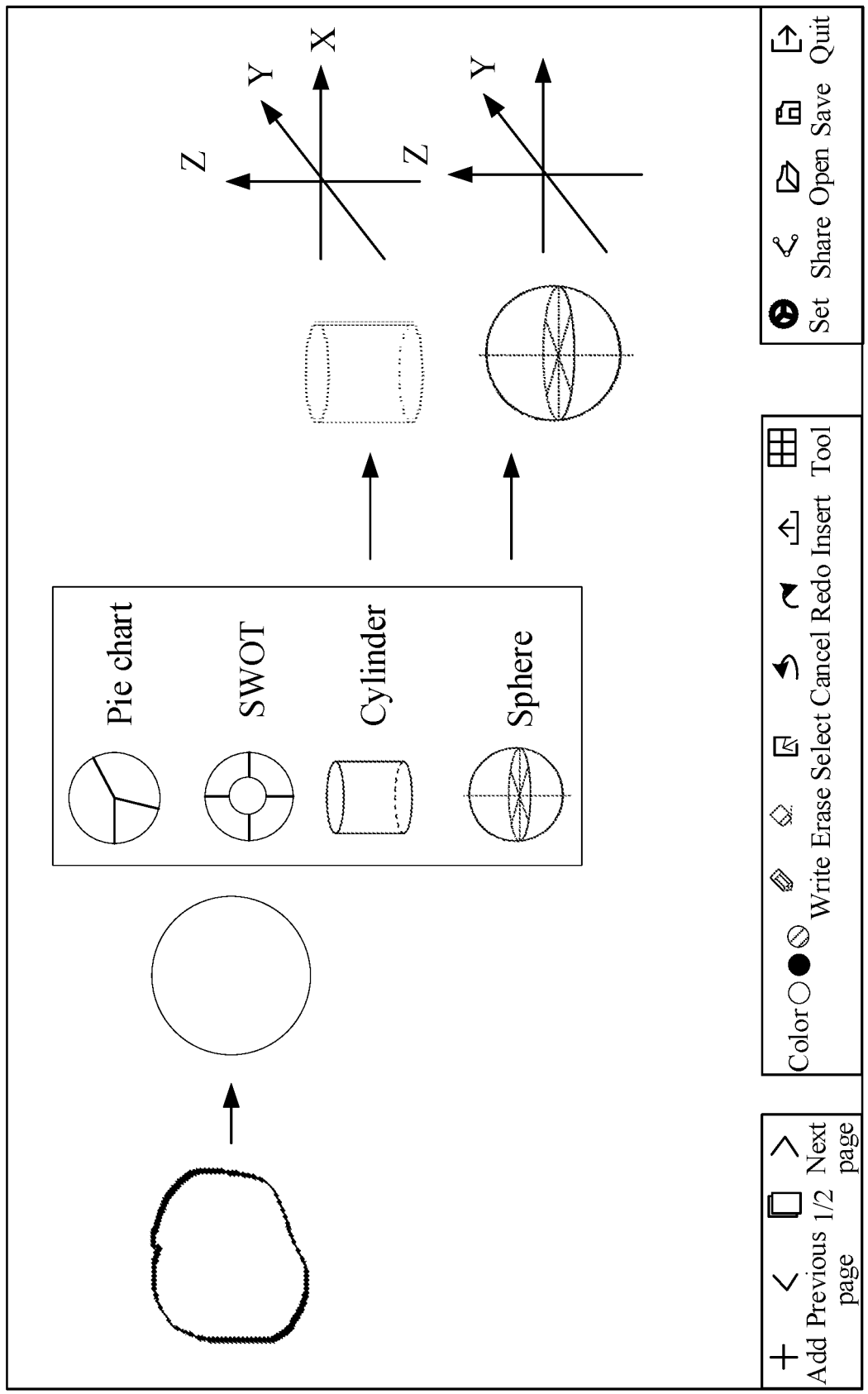
FIG. 18 is a flow chart of implementing intelligent image association of a circle according to an embodiment of the disclosure.

In some embodiments, as shown in FIG. 18, this embodiment further provides an implementation process of intelligent image association of a circle.

The user opens a graphic recognition button to enter a graphic recognition interface: a control list pops up after the user's hand-drawn circle is recognized as a standard circle: the user selects the control list or standard graph: where the user can select a standard pie chart, SWOT, cylinder or sphere: if the user clicks an outer area to close the control list, the standard circle is inserted at a position of the original hand-drawn circle: if the user selects the pie chart, a pie chart drawing interface (smart table-pie chart interface) is jumped to, and the pie chart (which may be a pie chart with preset partitions or a pie chart without partitions) is displayed: if the user selects the SWOT, the SWOT diagram is inserted at the position of the original hand-drawn circle: if the user selects the cylinder or sphere, the 3D rendering model is inserted at the original hand-drawn position, from the viewing angle of the front view by default: x, y and z axes appear after clicking or dragging the 3D model, and one of the axes is selected and then the corresponding directional schematic arc is dragged to rotate the viewing angle of the model in this direction.

Figure 19:
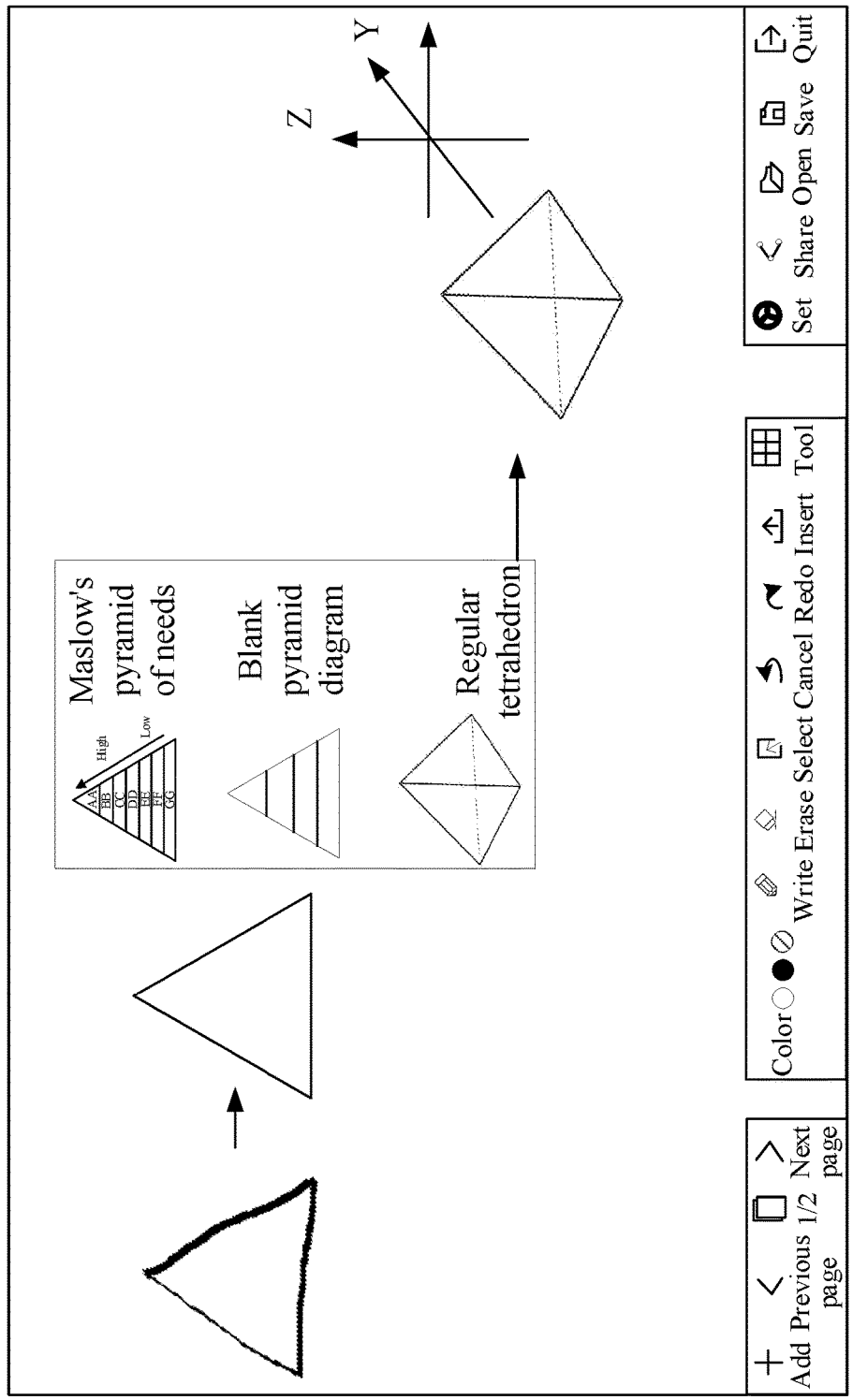
FIG. 19 is a flow chart of implementing intelligent image association of a triangle according to an embodiment of the disclosure.

In some embodiments, as shown in FIG. 19, this embodiment further provides an implementation process of intelligent image association of a triangle.

The user opens the graphic recognition button to enter the graphic recognition interface: the control list pops up after the user's hand-drawn triangle is recognized as a standard triangle: the user selects the control list or standard graph: where the user can select one of a Maslow's pyramid of needs, a blank pyramid diagram or a regular tetrahedron: if the user clicks the outer area to close the control list, the standard triangle is inserted at the position of the original hand-drawn triangle: if the user selects the Maslow's pyramid of needs or the pyramid diagram, the Maslow's pyramid of needs or the pyramid diagram is inserted at the position of the original hand-drawn triangle: if the user selects the regular tetrahedron, the 3D rendering model of the regular tetrahedron is inserted at the original hand-drawn position, from the viewing angle of the front view by default: where the logic of changing the viewing angle is the same as that of the above-mentioned cylinder and sphere, and will not be repeated here.

Figure 20:
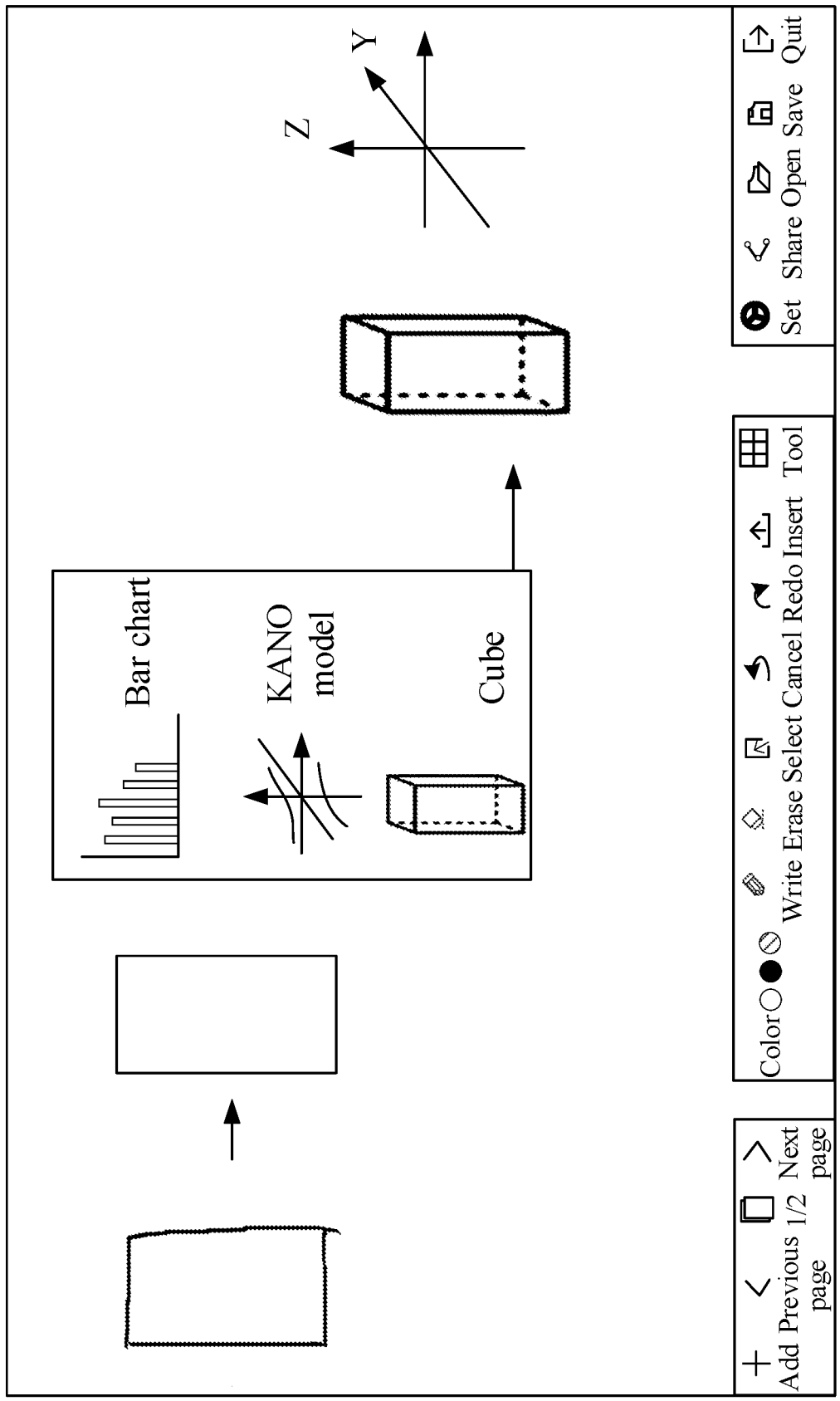
FIG. 20 is a flow chart of implementing intelligent image association of a rectangle according to an embodiment of the disclosure.

In some embodiments, as shown in FIG. 20, this embodiment further provides an implementation process of the intelligent image association of a rectangle.

The user opens the graphic recognition button to enter the graphic recognition interface: the control list pops up after the user's hand-drawn rectangle is recognized as a standard rectangle: the user selects the control list or standard rectangle: where the user can select one of a bar chart, a KANO model or a cube: if the user clicks the outer area to close the control list, the standard rectangle is inserted at the position of the original hand-drawn rectangle: if the user selects the bar chart, the bar chart drawing interface (smart table-bar chart interface) is jumped to, for displaying the bar chart: if the user selects the KANO model, the KANO model is inserted at the position of the original hand-drawn circle: if the user selects the cube, the 3D rendering model of the cube is inserted at the original hand-drawn position, from the viewing angle of the front view by default: where the logic of changing the viewing angle is the same as that of the above-mentioned cylinder and sphere, and will not be repeated here.

Embodiment 2: Based on the same inventive concept, an embodiment of the disclosure further provides a method for intelligent graphic association. This method is the method applied by the intelligent interactive display device in embodiments of the disclosure, and the principle of this method to solve the problem is similar to that of the intelligent interactive display device, so implementations of this method can refer to implementations of the intelligent interactive display device, and the repeated description thereof will be omitted here.

Figure 21:
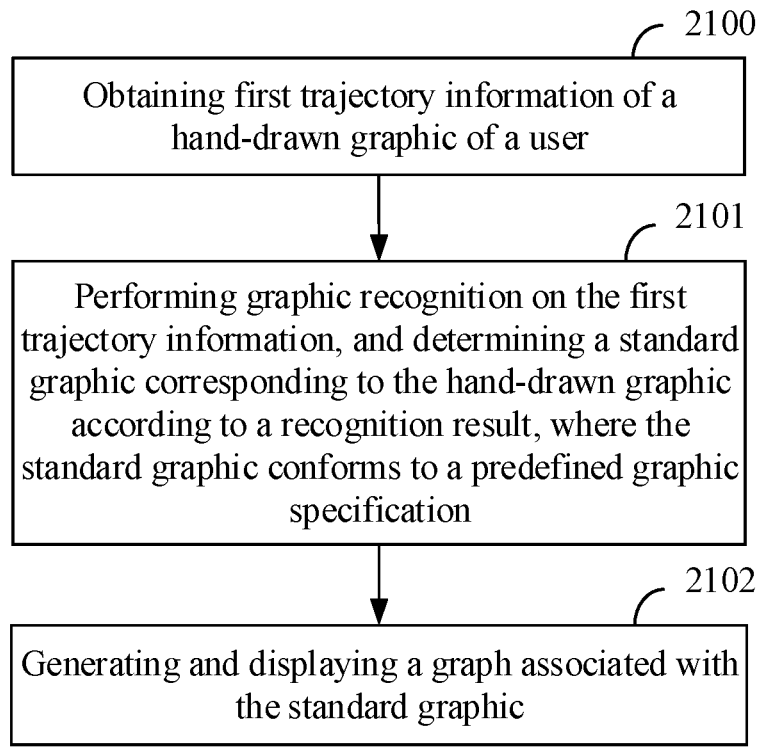
FIG. 21 is an implementation flowchart of a method for intelligent graphic association according to an embodiment of the disclosure.

As shown in FIG. 21, the implementation process of this method is as follows.

Step 2100: obtaining first trajectory information of a hand-drawn graphic of a user.

Step 2101: performing graphic recognition on the first trajectory information, and determining a standard graphic corresponding to the hand-drawn graphic according to a recognition result, where the standard graphic conforms to a predefined graphic specification.

Step 2102: generating and displaying a graph associated with the standard graphic.

As an optional embodiment, the generating and displaying the graph associated with the standard graphic, includes: displaying a control list of the standard graphic, where the control list includes at least one associative icon related to the standard graphic: generating and displaying the graph associated with the standard graphic in response to the user's instruction to select the associative icon.

As an optional embodiment, the generating and displaying the graph associated with the standard graphic in response to the user's instruction to select the associative icon, includes: in response to the user's instruction to select the associative icon, inserting a graph corresponding to the associative icon into a display interface of the hand-drawn graphic of the user; and/or in response to the user's instruction to select the associative icon, jumping to a graph drawing interface corresponding to the associative icon, and displaying a corresponding graph on the graph drawing interface.

As an optional embodiment, the control list includes a plurality of associative icons related to the standard graphic, and the generating and displaying the graph associated with the standard graphic in response to the user's instruction to select the associative icon, includes: in response to the user's instruction to select one associative icon of the associative icons included in the control list, inserting a graph corresponding to the associative icon into a display interface of the hand-drawn graphic of the user: in response to the user's instruction to select another associative icon included in the control list, jumping to a graph drawing interface corresponding to the associative icon, and displaying a corresponding graph on the graph drawing interface.

As an optional embodiment, the associative icon includes at least one of a pie chart icon, a bar chart icon, or a radar chart icon.

As an optional embodiment, the graph associated with the standard graphic includes a three-dimensional graphic, and the generating and displaying the graph associated with the standard graphic, includes: in response to the user's rotation instruction for the three-dimensional graphic, rotating and displaying the three-dimensional graphic in a direction corresponding to the rotation instruction.

As an optional embodiment, the generating and displaying the graph associated with the standard graphic, includes: generating and displaying the graph associated with the standard graphic in response to an instruction to add a coordinate axis drawn by the user.

As an optional embodiment, the generating and displaying the graph associated with the standard graphic in response to the instruction to add the coordinate axis drawn by the user, includes: jumping to a graph drawing interface of the graph associated with the standard graphic, and displaying the graph on the graph drawing interface, in response to the instruction to add the coordinate axis drawn by the user.

As an optional embodiment, the jumping to the graph drawing interface of the graph associated with the standard graphic and displaying the graph on the graph drawing interface in response to the instruction to add the coordinate axis drawn by the user, includes: when the standard graphic is a circle, jumping to a graph drawing interface corresponding to a pie chart, and displaying the pie chart on the graph drawing interface, in response to the instruction to add the coordinate axis drawn by the user: or when the standard graphic is a rectangle, jumping to a graph drawing interface corresponding to a bar chart, and displaying the bar chart on the graph drawing interface, in response to the instruction to add the coordinate axis drawn by the user: or when the standard graphic is a pentagon, jumping to a graph drawing interface corresponding to a radar chart, and displaying the radar chart on the graph drawing interface, in response to the instruction to add the coordinate axis drawn by the user.

As an optional embodiment, after generating and displaying the graph associated with the standard graphic, the method further includes: editing the graph correspondingly in response to the user's editing instruction for the graph, where the editing instruction includes at least one instruction of dividing the graph or merging a plurality of sub-areas included in the graph.

As an optional embodiment, the editing instruction includes an instruction of dividing the graph, and the editing the graph correspondingly in response to the user's editing instruction for the graph, includes: determining a standard dividing line corresponding to second trajectory information for dividing the graph included in the editing instruction according to the second trajectory information: displaying the second trajectory information as the standard dividing line, to divide the graph by the standard dividing line to obtain a plurality of divided areas.

As an optional embodiment: when the graph is a pie chart, the divided area represents a proportion of a same type of data in data included in the graph: or when the graph is a rectangle, the divided area represents a cell of a table.

As an optional embodiment, the graph is a pie chart, and when the second trajectory information passes through a preset area where a center of the pie chart is located, the determining the standard dividing line corresponding to the second trajectory information, includes: determining the standard dividing line according to a diameter line formed by a connecting line between a trajectory point in the second trajectory information intersecting with a point on a circumference of the pie chart and the center of the pie chart: or determining the standard dividing line according to a diameter line formed by a connecting line between a trajectory point in the second trajectory information closest to a point on a circumference of the pie chart and the center of the pie chart.

As an optional embodiment, the graph is a pie chart, and when the second trajectory information does not pass through a preset area where a center of the pie chart is located, the determining the standard dividing line corresponding to the second trajectory information, includes: determining the standard dividing line according to a radius line formed by a connecting line between a trajectory point in the second trajectory information intersecting with a point on a circumference of the pie chart and the center of the pie chart: or determining the standard dividing line according to a radius line formed by a connecting line between a trajectory point in the second trajectory information closest to a point on a circumference of the pie chart and the center of the pie chart.

As an optional embodiment, the method further includes: determining that the standard dividing line enters an editing mode in response to the user's operation: adjusting sizes of the divided areas in response to the user's dragging operation on the standard dividing line in the editing mode.

As an optional embodiment, the graph is a pie chart, and the method further includes: adjusting sizes of the divided areas in response to the user's dragging operation on an intersection point of the standard dividing line and a circumference of the pie chart in an editing mode.

As an optional embodiment, the method further includes: filling the divided areas with corresponding colors in response to the user's color selection instruction for the divided areas.

As an optional embodiment, the generating and displaying the graph associated with the standard graphic, includes: displaying trajectory information of the hand-drawn graphic of the user as the standard graphic: generating and displaying the graph associated with the standard graphic in response to the user's hand-drawn instruction for a dividing line of the standard graphic, where the hand-drawn instruction includes third trajectory information.

As an optional embodiment, the generating and displaying the graph associated with the standard graphic, includes: jumping to a graph drawing interface corresponding to a divided graphic obtained after dividing the standard graphic, and displaying the divided graphic on the graph drawing interface, in response to the user's hand-drawn instruction for the dividing line of the standard graphic.

As an optional embodiment, the jumping to the graph drawing interface corresponding to the divided graphic obtained after the standard graphic is divided, includes: when the standard graphic is a circle, jumping to a graph drawing interface corresponding to a pie chart in response to the user's hand-drawn instruction for a dividing line of the circle: or when the standard graphic is a rectangle, jumping to a graph drawing interface containing a table in response to the user's hand-drawn instruction for a dividing line of the rectangle.

As an optional embodiment, the determining the standard graphic corresponding to the hand-drawn graphic according to the recognition result, includes: determining a quantity of strokes and a shape feature included in the hand-drawn graphic according to the recognition result: determining the standard graphic according to a graphic specification conforming to the quantity of strokes and the shape feature.

As an optional embodiment, the standard graphic includes at least one of a circle, a triangle, a rectangle, a trapezoid, a rhombus or a pentagon.

As an optional embodiment, when the standard graphic is a circle, the graph associated with the standard graphic includes at least one of a circle, a pie chart, a SWOT chart, a cylinder or a sphere: or when the standard graphic is a triangle, the graph associated with the standard graphic includes at least one of a triangle, a Maslow's pyramid of needs, a blank pyramid diagram or a regular tetrahedron: or when the standard graphic is a rectangle, the graph associated with the standard graphic includes at least one of a rectangle, a bar chart, a KANO model or a cube: or when the standard graphic is a pentagon, the graph associated with the standard graphic includes at least one of a pentagon or a radar chart.

As an optional embodiment, a size of the standard graphic is determined according to coordinate values of trajectory points in the first trajectory information of the hand-drawn graphic of the user.

Embodiment 3: Based on the same inventive concept, an embodiment of the disclosure further provides an apparatus for intelligent graphic association. Implementations of this apparatus can refer to implementations of the intelligent interactive display device, and the repeated description thereof will be omitted here.

Figure 22:
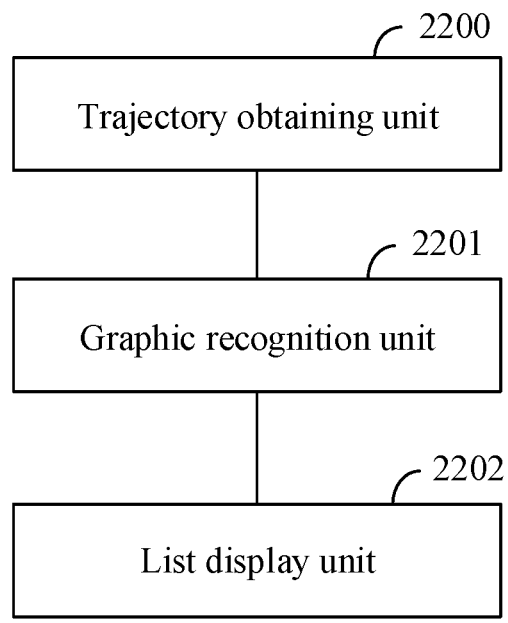
FIG. 22 is a schematic diagram of an apparatus for intelligent graphic association according to an embodiment of the disclosure.

As shown in FIG. 22, this apparatus includes: a trajectory obtaining unit 2200 configured to obtain trajectory information of a hand-drawn graphic of a user: a graphic recognition unit 2201 configured to perform graphic recognition on the trajectory information, and determine a standard graphic corresponding to the hand-drawn graphic according to a recognition result, where the standard graphic conforms to a predefined graphic specification: a list display unit 2202 configured to generate and display a graph associated with the standard graphic.

As an optional embodiment, the list display unit 2202 is configured to: display a control list of the standard graphic, where the control list includes at least one associative icon related to the standard graphic: generate and display the graph associated with the standard graphic in response to the user's instruction to select the associative icon.

As an optional embodiment, the list display unit 2202 is configured to: in response to the user's instruction to select the associative icon, insert a graph corresponding to the associative icon into a display interface of the hand-drawn graphic of the user; and/or in response to the user's instruction to select the associative icon, jump to a graph drawing interface corresponding to the associative icon, and display a corresponding graph on the graph drawing interface.

As an optional embodiment, the control list includes a plurality of associative icons related to the standard graphic, and the list display unit 2202 is configured to: in response to the user's instruction to select one associative icon of the associative icons included in the control list, insert a graph corresponding to the associative icon into a display interface of the hand-drawn graphic of the user: in response to the user's instruction to select another associative icon included in the control list, jump to a graph drawing interface corresponding to the associative icon, and display a corresponding graph on the graph drawing interface.

As an optional embodiment, the associative icon includes at least one of a pie chart icon, a bar chart icon, or a radar chart icon.

As an optional embodiment, the graph associated with the standard graphic includes a three-dimensional graphic, and the list display unit 2202 is configured to: in response to the user's rotation instruction for the three-dimensional graphic, rotate and display the three-dimensional graphic in a direction corresponding to the rotation instruction.

As an optional embodiment, the list display unit 2202 is configured to: generate and display the graph associated with the standard graphic in response to an instruction to add a coordinate axis drawn by the user.

As an optional embodiment, the list display unit 2202 is configured to: jump to a graph drawing interface of the graph associated with the standard graphic, and display the graph on the graph drawing interface, in response to the instruction to add the coordinate axis drawn by the user.

As an optional embodiment, the list display unit 2202 is configured to: when the standard graphic is a circle, jump to a graph drawing interface corresponding to a pie chart, and display the pie chart on the graph drawing interface, in response to the instruction to add the coordinate axis drawn by the user: or when the standard graphic is a rectangle, jump to a graph drawing interface corresponding to a bar chart, and display the bar chart on the graph drawing interface, in response to the instruction to add the coordinate axis drawn by the user: or when the standard graphic is a pentagon, jump to a graph drawing interface corresponding to a radar chart, and display the radar chart on the graph drawing interface, in response to the instruction to add the coordinate axis drawn by the user.

As an optional embodiment, after generating and displaying the graph associated with the standard graphic, this apparatus further includes an editing unit configured to: edit the graph correspondingly in response to the user's editing instruction for the graph, where the editing instruction includes at least one instruction of dividing the graph or merging a plurality of sub-areas included in the graph.

As an optional embodiment, the editing unit is configured to: determine a standard dividing line corresponding to second trajectory information for dividing the graph included in the editing instruction according to the second trajectory information: display the second trajectory information as the standard dividing line, to divide the graph by the standard dividing line to obtain a plurality of divided areas.

As an optional embodiment: when the graph is a pie chart, the divided area represents a proportion of a same type of data in data included in the graph: or when the graph is a rectangle, the divided area represents a cell of a table.

As an optional embodiment, the graph is a pie chart, and when the second trajectory information passes through a preset area where a center of the pie chart is located, the editing unit is configured to: determine the standard dividing line according to a diameter line formed by a connecting line between a trajectory point in the second trajectory information intersecting with a point on a circumference of the pie chart and the center of the pie chart: or determine the standard dividing line according to a diameter line formed by a connecting line between a trajectory point in the second trajectory information closest to a point on a circumference of the pie chart and the center of the pie chart.

As an optional embodiment, the graph is a pie chart, and when the second trajectory information does not pass through a preset area where a center of the pie chart is located, the editing unit is configured to: determine the standard dividing line according to a radius line formed by a connecting line between a trajectory point in the second trajectory information intersecting with a point on a circumference of the pie chart and the center of the pie chart: or determine the standard dividing line according to a radius line formed by a connecting line between a trajectory point in the second trajectory information closest to a point on a circumference of the pie chart and the center of the pie chart.

As an optional embodiment, the apparatus further includes a first adjustment unit configured to: determine that the standard dividing line enters an editing mode in response to the user's operation: adjust sizes of the divided areas in response to the user's dragging operation on the standard dividing line in the editing mode.

As an optional embodiment, the graph is a pie chart, and the apparatus further includes a second adjustment unit configured to: adjust sizes of the divided areas in response to the user's dragging operation on an intersection point of the standard dividing line and a circumference of the pie chart in an editing mode.

As an optional embodiment, this apparatus further includes a color filling unit configured to: fill the divided areas with corresponding colors in response to the user's color selection instruction for the divided areas.

As an optional embodiment, the list display unit 2202 is configured to: display trajectory information of the hand-drawn graphic of the user as the standard graphic: generate and display the graph associated with the standard graphic in response to the user's hand-drawn instruction for a dividing line of the standard graphic, where the hand-drawn instruction includes third trajectory information.

As an optional embodiment, the list display unit 2202 is configured to: jump to a graph drawing interface corresponding to a divided graphic obtained after dividing the standard graphic, and display the divided graphic on the graph drawing interface, in response to the user's hand-drawn instruction for the dividing line of the standard graphic.

As an optional embodiment, the list display unit 2202 is configured to: when the standard graphic is a circle, jump to a graph drawing interface corresponding to a pie chart in response to the user's hand-drawn instruction for a dividing line of the circle: or when the standard graphic is a rectangle, jump to a graph drawing interface including a table in response to the user's hand-drawn instruction for a dividing line of the rectangle.

As an optional embodiment, the graphic recognition unit 2201 is configured to: determine a quantity of strokes and a shape feature included in the hand-drawn graphic according to the recognition result: determine the standard graphic according to a graphic specification conforming to the quantity of strokes and the shape feature.

As an optional embodiment, the standard graphic includes at least one of a circle, a triangle, a rectangle, a trapezoid, a rhombus or a pentagon.

As an optional embodiment, when the standard graphic is a circle, the graph associated with the standard graphic includes at least one of a circle, a pie chart, a SWOT chart, a cylinder or a sphere: or when the standard graphic is a triangle, the graph associated with the standard graphic includes at least one of a triangle, a Maslow's pyramid of needs, a blank pyramid diagram or a regular tetrahedron: or when the standard graphic is a rectangle, the graph associated with the standard graphic includes at least one of a rectangle, a bar chart, a KANO model or a cube: or when the standard graphic is a pentagon, the graph associated with the standard graphic includes at least one of a pentagon or a radar chart.

As an optional embodiment, a size of the standard graphic is determined according to coordinate values of trajectory points in the first trajectory information of the hand-drawn graphic of the user.

Based on the same inventive concept, an embodiment of the disclosure further provides a computer storage medium storing a computer program thereon, where the program, when executed by a processor, implements following steps: obtaining first trajectory information of a hand-drawn graphic of a user: performing graphic recognition on the first trajectory information, and determining a standard graphic corresponding to the hand-drawn graphic according to a recognition result, where the standard graphic conforms to a predefined graphic specification: generating and displaying a graph associated with the standard graphic.

It should be understood by those skilled in the art that embodiments of the disclosure can be provided as methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, optical memories and the like) containing computer usable program codes therein.

The disclosure is described by reference to the flow charts and/or the block diagrams of the methods, the devices (systems) and the computer program products according to embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. An intelligent interactive display device, comprising a display screen and a control circuit, wherein:
the display screen is configured to display content;
the control circuit comprises a processor and a memory, the memory is configured to store a program executable by the processor, and the processor is configured to read the program in the memory and perform following steps:
obtaining first trajectory information of a hand-drawn graphic of a user;
performing graphic recognition on the first trajectory information, and determining a standard graphic corresponding to the hand-drawn graphic according to a recognition result, wherein the standard graphic conforms to a predefined graphic specification;
generating and displaying a graph associated with the standard graphic;
wherein the processor is configured to:
display a control list of the standard graphic, wherein the control list comprises at least one associative icon related to the standard graphic;
generate and display the graph associated with the standard graphic in response to the user's instruction to select the associative icon.

2. The display device according to claim 1, wherein the processor is configured to:
in response to the user's instruction to select the associative icon, insert a graph corresponding to the associative icon into a display interface of the hand-drawn graphic of the user; and/or
in response to the user's instruction to select the associative icon, jump to a graph drawing interface corresponding to the associative icon, and display a corresponding graph on the graph drawing interface.

3. The display device according to claim 2, wherein the associative icon comprises at least one of a pie chart icon, a bar chart icon, or a radar chart icon.

4. The display device according to claim 1, wherein the control list comprises a plurality of associative icons related to the standard graphic, and the processor is configured to:
in response to the user's instruction to select one associative icon of the associative icons comprised in the control list, insert a graph corresponding to the associative icon into a display interface of the hand-drawn graphic of the user;
in response to the user's instruction to select another associative icon comprised in the control list, jump to a graph drawing interface corresponding to the associative icon, and display a corresponding graph on the graph drawing interface.

5. The display device according to claim 1, wherein the graph associated with the standard graphic comprises a three-dimensional graphic, and the processor is configured to:
in response to the user's rotation instruction for the three-dimensional graphic, rotate and display the three-dimensional graphic in a direction corresponding to the rotation instruction.

6. The display device according to claim 1, wherein the processor is configured to:
generate and display the graph associated with the standard graphic in response to an instruction to add a coordinate axis drawn by the user;
wherein the processor is configured to:
jump to a graph drawing interface of the graph associated with the standard graphic, and display the graph on the graph drawing interface, in response to the instruction to add the coordinate axis drawn by the user;
wherein the processor is configured to:
when the standard graphic is a circle, jump to a graph drawing interface corresponding to a pie chart, and display the pie chart on the graph drawing interface, in response to the instruction to add the coordinate axis drawn by the user; or when the standard graphic is a rectangle, jump to a graph drawing interface corresponding to a bar chart, and display the bar chart on the graph drawing interface, in response to the instruction to add the coordinate axis drawn by the user; or when the standard graphic is a pentagon, jump to a graph drawing interface corresponding to a radar chart, and display the radar chart on the graph drawing interface, in response to the instruction to add the coordinate axis drawn by the user.

7. The display device according to claim 1, wherein, after generating and displaying the graph associated with the standard graphic, the processor is further configured to:

edit the graph correspondingly in response to the user's editing instruction for the graph, wherein the editing instruction comprises at least one instruction of dividing the graph or merging a plurality of sub-areas comprised in the graph;

wherein the editing instruction comprises an instruction of dividing the graph, and the processor is configured to:

determine a standard dividing line corresponding to second trajectory information for dividing the graph comprised in the editing instruction according to the second trajectory information;

display the second trajectory information as the standard dividing line, to divide the graph by the standard dividing line to obtain a plurality of divided areas.

8. The display device according to claim 7, wherein:

when the graph is a pie chart, the divided area represents a proportion of a same type of data in data comprised in the graph; or when the graph is a rectangle, the divided area represents a cell of a table.

9. The display device according to claim 7, wherein the graph is a pie chart, and when the second trajectory information passes through a preset area where a center of the pie chart is located, the processor is configured to:

determine the standard dividing line according to a diameter line formed by a connecting line between a trajectory point in the second trajectory information intersecting with a point on a circumference of the pie chart and the center of the pie chart; or determine the standard dividing line according to a diameter line formed by a connecting line between a trajectory point in the second trajectory information closest to a point on a circumference of the pie chart and the center of the pie chart.

10. The display device according to claim 7, wherein the graph is a pie chart, and when the second trajectory information does not pass through a preset area where a center of the pie chart is located, the processor is configured to:

determine the standard dividing line according to a radius line formed by a connecting line between a trajectory point in the second trajectory information intersecting with a point on a circumference of the pie chart and the center of the pie chart; or determine the standard dividing line according to a radius line formed by a connecting line between a trajectory point in the second trajectory information closest to a point on a circumference of the pie chart and the center of the pie chart.

11. The display device according to claim 7, wherein the processor is further configured to:

determine that the standard dividing line enters an editing mode in response to the user's operation;

adjust sizes of the divided areas in response to the user's dragging operation on the standard dividing line in the editing mode.

12. The display device according to claim 7, wherein the graph is a pie chart, and the processor is further configured to:

adjust sizes of the divided areas in response to the user's dragging operation on an intersection point of the standard dividing line and a circumference of the pie chart in an editing mode.

13. The display device according to claim 7, wherein the processor is further configured to:

fill the divided areas with corresponding colors in response to the user's color selection instruction for the divided areas.

14. The display device according to claim 1, wherein the processor is configured to:

display trajectory information of the hand-drawn graphic of the user as the standard graphic;

generate and display the graph associated with the standard graphic in response to the user's hand-drawn instruction for a dividing line of the standard graphic, wherein the hand-drawn instruction comprises third trajectory information;

wherein the processor is configured to:

jump to a graph drawing interface corresponding to a divided graphic obtained after dividing the standard graphic, and display the divided graphic on the graph drawing interface, in response to the user's hand-drawn instruction for the dividing line of the standard graphic;

wherein the processor is configured to:

when the standard graphic is a circle, jump to a graph drawing interface corresponding to a pie chart in response to the user's hand-drawn instruction for a dividing line of the circle; or when the standard graphic is a rectangle, jump to a graph drawing interface comprising a table in response to the user's hand-drawn instruction for a dividing line of the rectangle.

15. The display device according to claim 1, wherein the processor is configured to:

determine a quantity of strokes and a shape feature comprised in the hand-drawn graphic according to the recognition result;

determine the standard graphic according to a graphic specification conforming to the quantity of strokes and the shape feature.

16. The display device according to claim 1, wherein the standard graphic comprises at least one of a circle, a triangle, a rectangle, a trapezoid, a rhombus or a pentagon;

when the standard graphic is a circle, the graph associated with the standard graphic comprises at least one of a circle, a pie chart, a SWOT chart, a cylinder or a sphere; or when the standard graphic is a triangle, the graph associated with the standard graphic comprises at least one of a triangle, a Maslow's pyramid of needs, a blank pyramid diagram or a regular tetrahedron; or when the standard graphic is a rectangle, the graph associated with the standard graphic comprises at least one of a rectangle, a bar chart, a KANO model or a cube; or when the standard graphic is a pentagon, the graph associated with the standard graphic comprises at least one of a pentagon or a radar chart.

17. The display device according to claim 1, wherein a size of the standard graphic is determined according to coordinate values of trajectory points in the first trajectory information of the hand-drawn graphic of the user.

18. A method for intelligent graphic association, comprising:
- obtaining first trajectory information of a hand-drawn graphic of a user;
- performing graphic recognition on the first trajectory information, and determining a standard graphic corresponding to the hand-drawn graphic according to a recognition result, wherein the standard graphic conforms to a predefined graphic specification;
- generating and displaying a graph associated with the standard graphic;
- wherein the generating and displaying the graph associated with the standard graphic comprises:
- displaying a control list of the standard graphic, wherein the control list comprises at least one associative icon related to the standard graphic;
- generating and displaying the graph associated with the standard graphic in response to the user's instruction to select the associative icon.

19. A non-transitory computer storage medium storing a computer program thereon, wherein the program, when executed by a processor, implements steps in the method for intelligent graphic association according to claim 18.

20. An intelligent interactive display device, comprising a display screen and a control circuit, wherein:
- the display screen is configured to display content;
- the control circuit comprises a processor and a memory, the memory is configured to store a program executable by the processor, and the processor is configured to read the program in the memory and perform following steps:
- obtaining first trajectory information of a hand-drawn graphic of a user;
- performing graphic recognition on the first trajectory information, and determining a standard graphic corresponding to the hand-drawn graphic according to a recognition result, wherein the standard graphic conforms to a predefined graphic specification;
- generating and displaying a graph associated with the standard graphic;
- wherein the processor is configured to:
- generate and display the graph associated with the standard graphic in response to an instruction to add a coordinate axis drawn by the user;
- wherein the processor is configured to:
- jump to a graph drawing interface of the graph associated with the standard graphic, and display the graph on the graph drawing interface, in response to the instruction to add the coordinate axis drawn by the user;
- wherein the processor is configured to:
- when the standard graphic is a circle, jump to a graph drawing interface corresponding to a pie chart, and display the pie chart on the graph drawing interface, in response to the instruction to add the coordinate axis drawn by the user; or
- when the standard graphic is a rectangle, jump to a graph drawing interface corresponding to a bar chart, and display the bar chart on the graph drawing interface, in response to the instruction to add the coordinate axis drawn by the user; or
- when the standard graphic is a pentagon, jump to a graph drawing interface corresponding to a radar chart, and display the radar chart on the graph drawing interface, in response to the instruction to add the coordinate axis drawn by the user.

\* \* \* \* \*